(12) United States Patent
Shimoshikiryoh et al.

(10) Patent No.: US 12,276,880 B2
(45) Date of Patent: Apr. 15, 2025

(54) LIQUID CRYSTAL DISPLAY DEVICE

(71) Applicant: Sharp Display Technology Corporation, Kameyama (JP)

(72) Inventors: Fumikazu Shimoshikiryoh, Kameyama (JP); Shinichi Terashita, Kameyama (JP); Kouichi Watanabe, Kameyama (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 18/378,856

(22) Filed: Oct. 11, 2023

(65) Prior Publication Data

US 2024/0168327 A1    May 23, 2024

(30) Foreign Application Priority Data

Nov. 21, 2022  (JP) .................... 2022-185663

(51) Int. Cl.
| G02F 1/1335 | (2006.01) |
| G02F 1/1333 | (2006.01) |
| G02F 1/1337 | (2006.01) |
| G02F 1/1343 | (2006.01) |
| G02F 1/1362 | (2006.01) |
| G02F 1/1368 | (2006.01) |

(52) U.S. Cl.
CPC .. *G02F 1/133553* (2013.01); *G02F 1/133345* (2013.01); *G02F 1/133738* (2021.01); *G02F 1/136227* (2013.01); *G02F 1/1368* (2013.01); *G02F 1/13338* (2013.01); *G02F 1/13439* (2013.01); *G02F 2203/02* (2013.01)

(58) Field of Classification Search
None
See application file for complete search history.

(56) References Cited

U.S. PATENT DOCUMENTS

2007/0013835 A1*  1/2007  Matsushima ..... G02F 1/134363
                                                    349/113
2009/0262286 A1* 10/2009  Nishida ................ G02F 1/137
                                                    349/114
(Continued)

FOREIGN PATENT DOCUMENTS

JP      2000-122094 A     4/2000
JP         3394926 B2     4/2003
(Continued)

*Primary Examiner* — Phu Vu
(74) *Attorney, Agent, or Firm* — ScienBiziP, P.C.

(57) ABSTRACT

A liquid crystal display device includes a first substrate, a second substrate disposed more to a viewer side than the first substrate, and a liquid crystal layer provided between the first substrate and the second substrate, with a plurality of pixels being arrayed in a matrix shape. Each pixel includes a reflective region for display in a reflection mode. The first substrate includes a thin film transistor provided corresponding to each pixel, a pixel electrode electrically connected to the thin film transistor, and a reflective layer located at least in the reflective region. The first substrate further includes a common electrode adjacent to the pixel electrode with a dielectric layer interposed between the pixel electrode and the common electrode. At least one from among the pixel electrode and the common electrode includes at least one slit.

19 Claims, 23 Drawing Sheets

(56) References Cited

U.S. PATENT DOCUMENTS

| | | | |
|---|---|---|---|
| 2011/0032460 A1* | 2/2011 | Lee | G02F 1/133555 |
| | | | 438/30 |
| 2012/0138922 A1 | 6/2012 | Yamazaki et al. | |
| 2013/0320334 A1 | 12/2013 | Yamazaki et al. | |
| 2014/0286076 A1 | 9/2014 | Aoki et al. | |

FOREIGN PATENT DOCUMENTS

| JP | 2003-131268 A | 5/2003 |
|---|---|---|
| JP | 2004-094228 A | 3/2004 |
| JP | 2012-134475 A | 7/2012 |
| JP | 2014-007399 A | 1/2014 |
| JP | 2014-209727 A | 11/2014 |

* cited by examiner

LIQUID CRYSTAL DISPLAY DEVICE

CROSS-REFERENCE TO RELATED APPLICATIONS

This application claims the benefit of priority to Japanese Patent Application Number 2022-185663 filed on Nov. 21, 2022. The entire contents of the above-identified application are hereby incorporated by reference.

BACKGROUND

Technical Field

The disclosure relates to a liquid crystal display device.

Liquid crystal display devices are roughly classified into transmissive liquid crystal display devices and reflective liquid crystal display devices. Transmissive liquid crystal display devices perform display in a transmission mode using light emitted from a backlight. Reflective liquid crystal display devices perform display in a reflection mode using ambient light. A liquid crystal display device has been proposed in which each pixel includes a reflective region for display in the reflection mode, and a transmissive region for displaying in the transmission mode. Such a liquid crystal display device is referred to as a transflective or a transmissive/reflective liquid crystal display device.

Reflective and transflective liquid crystal display devices are, for example, suitable for use as medium or small display devices for mobile applications used outside. An example of the reflective liquid crystal display device is disclosed in JP 2000-122094 A. An example of the transflective liquid crystal display device is disclosed in JP 2003-131268 A.

Also, the liquid crystal display device used in a smartphone, a tablet, or the like has a touch sensor function. Various types of touch sensors are known, such as a resistive film type, an electrostatic capacitive type, and an optical type.

Liquid crystal display devices including a touch sensor (hereinafter referred to as a "touch panel") may be roughly classified into a type in which a touch sensor is externally attached to a liquid crystal display device ("external type") and a type in which a touch sensor is built into a liquid crystal display device ("built-in type"). The built-in touch panel is more advantageous for thickness and weight reduction, and the like than the external touch panel, and has the advantage of increasing a transmittance of light.

The built-in touch panel includes an on-cell touch panel and an in-cell touch panel. Here, a "cell" refers to a display panel. The display panel includes an active matrix substrate (hereinafter, referred to as a "TFT substrate"), a counter substrate disposed facing the TFT substrate, and a liquid crystal layer provided between the TFT substrate and the counter substrate. The "in-cell type" refers to those provided with a layer that serves as a touch sensor function in the display panel. The "on-cell type" refers to those provided with a layer that serves as a touch sensor function and is disposed between the display panel and the polarizer provided on the viewer side of the display panel.

SUMMARY

In principle, in-cell touch panels can be made the thinnest and lightest touch panels. As described above, a liquid crystal display device that can perform display in a reflection mode is suitable for outdoor use. Thus, an in-cell touch panel that can perform display in a reflection mode is desired, but has not yet been realized.

An embodiment of the disclosure has been made in view of the problems described above and is directed at realizing a pixel structure suitable for a liquid crystal display device that can perform display in a reflection mode and be used as an in-cell touch panel.

The present specification discloses a liquid crystal display device according to the following items.

Item 1

A liquid crystal display device includes:
a first substrate;
a second substrate disposed more to a viewer side than the first substrate;
a liquid crystal layer provided between the first substrate and the second substrate;
a polarizer disposed more to the viewer side than the liquid crystal layer;
a retardation layer disposed between the polarizer and the liquid crystal layer; and
a plurality of pixels arrayed in a matrix shape including a plurality of rows and a plurality of columns,
wherein each one of the plurality of pixels includes a reflective region for display in a reflection mode,
the first substrate includes
a thin film transistor provided corresponding to each one of the plurality of pixels,
a pixel electrode electrically connected to the thin film transistor, and
a reflective layer located at least in the reflective region,
the first substrate further includes a common electrode adjacent to the pixel electrode with a dielectric layer interposed between the pixel electrode and the common electrode, and
at least one from among the pixel electrode and the common electrode includes at least one slit.

Item 2

In the liquid crystal display device according to Item 1, the reflective layer is formed of a conductive material and electrically connected to the common electrode.

Item 3

In the liquid crystal display device according to Item 2,
the reflective layer has a layered structure including a metal layer and a transparent conductive layer,
the metal layer includes at least one opening, and
the transparent conductive layer is formed with a portion overlapping the at least one opening.

Item 4

In the liquid crystal display device according to any one of Items 1 to 3,
the first substrate includes a first horizontal alignment film in contact with the liquid crystal layer,
the second substrate includes a second horizontal alignment film in contact with the liquid crystal layer, and
the liquid crystal layer has a twist alignment when no voltage is applied.

Item 5

In the liquid crystal display device according to Item 4, a twist angle of the liquid crystal layer when no voltage is applied is in a range from 45° to 90°.

Item 6

In the liquid crystal display device according to any one of Items 1 to 5,
the reflective layer is located between the liquid crystal layer and the thin film transistor and at least partially overlaps the thin film transistor when viewed in a normal direction of a display surface.

Item 7

In the liquid crystal display device according to any one of Items 1 to 6,
the first substrate further includes a first interlayer insulating layer provided between the reflective layer and the thin film transistor.

Item 8

In the liquid crystal display device according to any one of Items 1 to 7,
the first substrate further includes a second interlayer insulating layer provided between an electrode located relatively lower from among the pixel electrode and the common electrode and the reflective layer.

Item 9

In the liquid crystal display device according to any one of Items 1 to 6,
the first substrate further includes
a first interlayer insulating layer provided between the reflective layer and the thin film transistor and
a second interlayer insulating layer provided between an electrode located relatively lower from among the pixel electrode and the common electrode and the reflective layer,
a first contact hole is formed in the first interlayer insulating layer,
a second contact hole is formed in the second interlayer insulating layer, and
the pixel electrode is connected to the thin film transistor via both the first contact hole and the second contact hole.

Item 10

In the liquid crystal display device according to Item 9,
a center of the first contact hole and a center of the second contact hole do not overlap when viewed in a normal direction of a display surface.

Item 11

In the liquid crystal display device according to Item 9,
the first contact hole and the second contact hole do not overlap when viewed in a normal direction of a display surface.

Item 12

In the liquid crystal display device according to any one of Item 9 to 11,
at least one third contact hole is formed in at least the second interlayer insulating layer, and
the reflective layer is connected to the common electrode via the at least one third contact hole.

Item 13

In the liquid crystal display device according to Item 12,
wherein the reflective layer has a layered structure including a metal layer and a transparent conductive layer,
the metal layer includes at least one opening,
the transparent conductive layer is formed with a portion overlapping the at least one opening, and
a third contact hole from among the at least one third contact hole overlaps an opening from among the at least one opening of the metal layer when viewed in a normal direction of a display surface.

Item 14

In the liquid crystal display device according to Item 12 or 13,
a center of the first contact hole and a center of each of the at least one third contact hole do not overlap when viewed in a normal direction of a display surface.

Item 15

In the liquid crystal display device according to Item 12 or 13,
the first contact hole and the at least one third contact hole do not overlap when viewed in a normal direction of a display surface.

Item 16

In the liquid crystal display device according to any one of Items 12 to 15,
the at least one third contact hole includes a plurality of third contact holes.

Item 17

In the liquid crystal display device according to Item 16,
the number of the plurality of third contact holes is less than the number of the plurality of pixels.

Item 18

In the liquid crystal display device according to Item 16,
the number of the plurality of third contact holes is one third or less of the number of the plurality of pixels.

Item 19

In the liquid crystal display device according to any one of Items 16 to 18,
two adjacent third contact holes from among the plurality of third contact holes are separated by a distance corresponding to one pixel or more in a row direction and/or a column direction.

Item 20

In the liquid crystal display device according to any one of Items 16 to 19,
- at least one third contact hole from among the plurality of third contact holes is located between adjacent two of the pixel electrodes when viewed in a normal direction of a display surface.

Item 21

In the liquid crystal display device according to any one of Items 8 to 20,
- the reflective layer has an uneven surface structure, and
- a thickness of the second interlayer insulating layer is greater than a height difference of the uneven surface structure.

Item 22

In the liquid crystal display device according to Item 21,
- the thickness of the second interlayer insulating layer is twice or more the height difference of the uneven surface structure.

Item 23

In the liquid crystal display device according to Item 21 or 22,
- an upper surface of a portion of the second interlayer insulating layer that overlaps the uneven surface structure of the reflective layer has an uneven shape, and
- a height difference of the uneven shape of the second interlayer insulating layer is half or less of the height difference of the uneven surface structure of the reflective layer.

Item 24

In the liquid crystal display device according to any one of Items 1 to 23,
- each one of the plurality of pixels includes a transmissive region for display in a transmission mode, and
- the reflective layer includes an opening formed in the transmissive region.

Item 25

The liquid crystal display device according to Item 24 further includes:
- a light source and another polarizer disposed more to a back surface side than the first substrate; and
- another retardation layer disposed between the another polarizer and the liquid crystal layer.

According to an embodiment of the disclosure, it is possible to realize a pixel structure suitable for a liquid crystal display device that can perform display in a reflection mode and be used as an in-cell touch panel.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described with reference to the accompanying drawings. Note that the embodiments of the disclosure are not limited to those illustrated below.

First Embodiment

Figure 1:
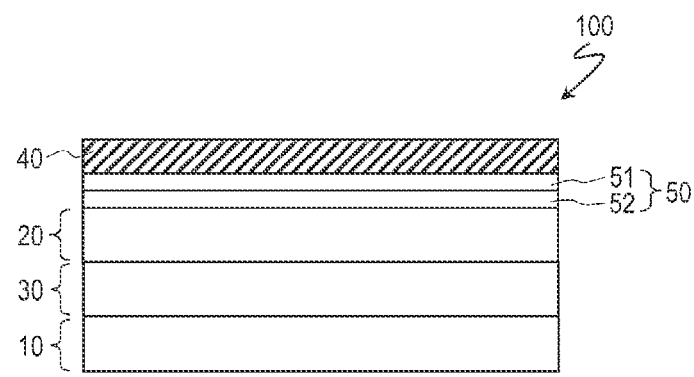
FIG. 1 is a cross-sectional view schematically illustrating a liquid crystal display device 100 according to an embodiment of the disclosure.
Figure 2:
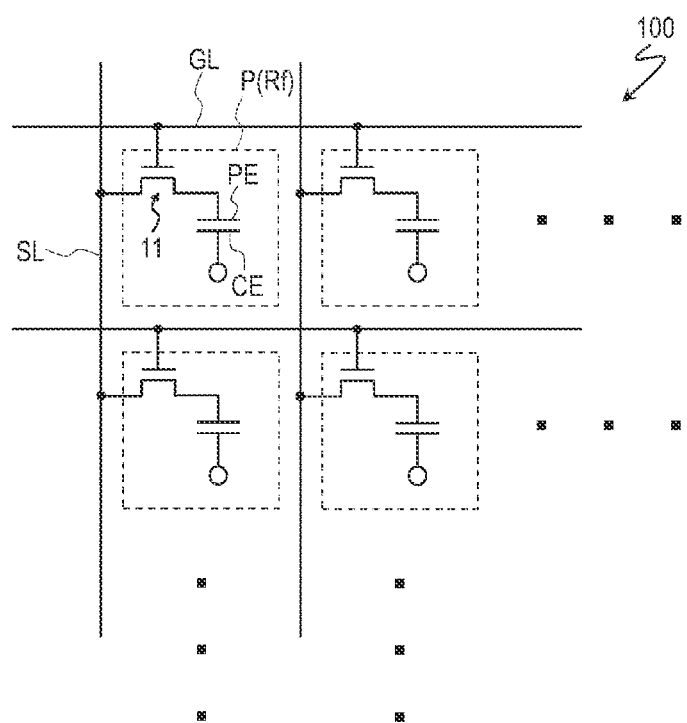
FIG. 2 is an equivalent circuit diagram of a plurality of pixels P included in the liquid crystal display device 100.

A liquid crystal display device 100 according to the present embodiment will be described with reference to FIGS. 1 and 2. The liquid crystal display device 100 is a reflective liquid crystal display device that performs display in a normally black mode. FIG. 1 is a cross-sectional view schematically illustrating the liquid crystal display device 100. FIG. 2 is an equivalent circuit diagram of a plurality of pixels P included in the liquid crystal display device 100.

As illustrated in FIG. 1, the liquid crystal display device 100 includes an active matrix substrate (hereinafter, referred to as "TFT substrate") 10, a counter substrate (also referred to as a "color filter substrate") 20 disposed more to the viewer side than the TFT substrate 10, and a liquid crystal layer 30 provided between the TFT substrate 10 and the counter substrate 20. The liquid crystal display device 100 further includes a polarizer 40 disposed more to the viewer side than the liquid crystal layer 30 and a retardation layer 50 disposed between the polarizer 40 and the liquid crystal layer 30. Here, the polarizer 40 is disposed more to the viewer side than the counter substrate 20, and the retardation layer 50 is disposed between the polarizer 40 and the counter substrate 20. Specifically, the polarizer 40 is an absorbing linear polarizer. In the example illustrated, the retardation layer 50 includes a $\lambda/2$ plate 51 and a $\lambda/4$ plate 52.

Also, the liquid crystal display device 100 includes the plurality of pixels P as illustrated in FIG. 2. The plurality of pixels P are arrayed in a matrix shape including a plurality of rows and a plurality of columns. The plurality of pixels P typically include red pixels that display red, green pixels that display green, and blue pixels that display blue.

Each pixel P includes a thin film transistor (TFT) 11, and a pixel electrode PE and a common electrode CE that can generate a transverse electrical field (fringe electrical field) in the liquid crystal layer 30. A gate electrode of the TFT 11 is electrically connected to a corresponding gate wiring line (scanning wiring line) GL. A source electrode of the TFT 11 is electrically connected to the corresponding source wiring line (signal wiring line) SL. A drain electrode of the TFT 11 is electrically connected to the pixel electrode PE.

As described above, the reflective liquid crystal display device 100 is a reflective type. Thus, each pixel P includes a reflective region Rf for display in a reflection mode.

Figure 3:
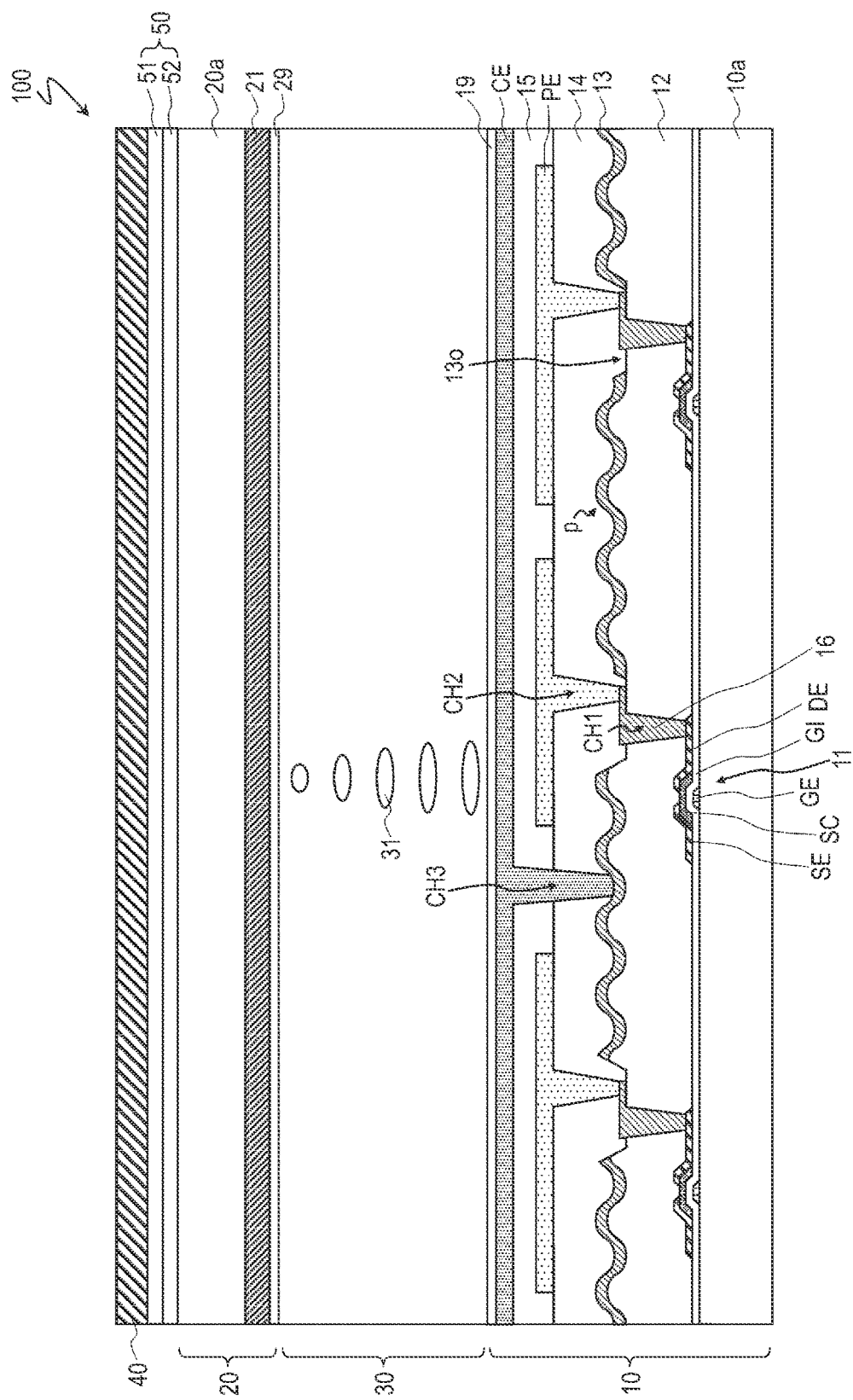
FIG. 3 is a cross-sectional view schematically illustrating the liquid crystal display device 100.

Next, the configuration of the TFT substrate 10 and the counter substrate 20 will be described in detail with reference to the FIGS. 3 and 4A to 4G. FIG. 3 is a cross-sectional view schematically illustrating the liquid crystal display device 100. FIGS. 4A to 4G are plan views schematically illustrating the layers of the TFT substrate 10.

The TFT substrate 10 includes a substrate 10a, the TFT 11, a first interlayer insulating layer 12, and a reflective layer 13. The TFT substrate 10 further includes a second interlayer insulating layer 14, the pixel electrode PE, a dielectric layer 15, the common electrode CE, and a first horizontal alignment film 19. FIGS. 4A to 4G respectively illustrate a backplane circuit BP including the TFT 11, the first interlayer insulating layer 12, the reflective layer 13, the second interlayer insulating layer 14, the pixel electrode PE, the dielectric layer 15, and the common electrode CE, with the illustrated region corresponding to an 8 row by 11 column grid of the pixels P.

The substrate 10a supports the TFT 11 and the like. The substrate 10a is transparent and has insulating properties. The substrate 10a is, for example, a glass substrate or a plastic substrate.

The TFT 11 is provided above the substrate 10a. The TFT 11 is provided corresponding to each one of the plurality of pixels P. The TFT 11 includes a gate electrode GE, a gate insulating layer GI, a semiconductor layer SC, a source electrode SE, and a drain electrode DE. The gate electrode GE is electrically connected to the corresponding gate wiring line GL, and the source electrode SE is electrically connected to the corresponding source wiring line SL. The drain electrode DE is electrically connected to the pixel electrode PE. The circuit for driving the plurality of pixels P including the TFT 11, the gate wiring line GL, the source wiring line SL, and the like may be referred to as the backplane circuit BP. Note that the TFT 11 illustrated in FIG. 3 has a bottom gate structure, but the TFT 11 may have a top gate structure or a double gate structure.

The first interlayer insulating layer 12 is provided covering the backplane circuit BP. The first interlayer insulating layer 12 is a layer formed of an organic insulating material and can be formed using, for example, a photosensitive resin.

The reflective layer 13 is provided above the first interlayer insulating layer 12 and located at least in the reflective region Rf. That is, the reflective layer 13 is disposed above the backplane circuit BP with the first interlayer insulating layer 12 interposed therebetween. In other words, the first interlayer insulating layer 12 is provided between the reflective layer 13 and the TFT 11. To paraphrase further, the reflective layer 13 is adjacent to the TFT 11 with at least the first interlayer insulating layer 12 interposed therebetween.

The reflective layer 13 is formed of a conductive material that reflects light. Specifically, the reflective layer 13 is formed of a metal material with high reflectivity. As a material of the reflective layer 13, for example, a silver alloy, aluminum, and an aluminum alloy can be used.

The surface of the reflective layer 13 has an uneven shape. Thus, the reflective layer 13 has an uneven surface structure. The uneven surface structure of the reflective layer 13 is also referred to as a micro reflective structure (MRS) and is provided to diffusely reflect ambient light to achieve display similar to paper white. The uneven surface structure can, for example, be constituted by a plurality of protruding portions p arranged randomly such that a center-to-center spacing between adjacent protruding portions p is from 5 μm to 50 μm, and preferably from 10 μm to 20 μm. When viewed from the normal direction of the substrate 10a, the shapes of the protruding portions p are substantially circular or substantially polygonal. An area of the protruding portions p occupying the pixel P is, for example, from approximately 20% to 40%. A height of the protruding portions p is from 1 μm to 5 μm, for example.

The method of forming the uneven surface structure on the reflective layer 13 is not particularly limited. For example, as illustrated, by forming the first interlayer insulating layer 12 having an uneven surface structure and forming the reflective layer 13 above the first interlayer insulating layer 12, an uneven shape reflecting the uneven surface structure of the first interlayer insulating layer 12 can be imparted to the surface of the reflective layer 13. The first interlayer insulating layer 12 having the uneven surface structure may be formed by the method disclosed in JP 3394926 B, for example.

The reflective layer 13 is located between the liquid crystal layer 30 and the TFT 11. When viewed in a normal direction of a display surface, the reflective layer 13 at least partially overlaps the TFT 11.

The second interlayer insulating layer 14 is provided above the first interlayer insulating layer 12 covering the reflective layer 13. Thus, it can be said that the reflective layer 13 is provided between the first interlayer insulating layer 12 and the second interlayer insulating layer 14. The second interlayer insulating layer 14 is a flattening layer formed of an organic insulating material and can be formed using, for example, a photosensitive resin.

The pixel electrode PE is provided to each of the plurality of pixels P. Also, the pixel electrode PE is provided above the second interlayer insulating layer 14. That is, the pixel electrode PE is disposed above the reflective layer 13 with the second interlayer insulating layer 14 interposed therebetween. In other words, the second interlayer insulating layer 14 is provided between the pixel electrode PE and the reflective layer 13. To paraphrase further, the reflective layer 13 is adjacent to the pixel electrode PE with at least the second interlayer insulating layer 14 interposed therebetween and is positioned on the opposite side (in other words, more to the back surface side than the pixel electrode PE) to the liquid crystal layer 30 relative to the pixel electrode PE.

The pixel electrode PE is formed of a transparent conductive material. As the transparent conductive material, for example, indium tin oxide (ITO), indium zinc oxide (IZO (trade name)), or a mixture thereof can be used. The pixel electrode PE is electrically connected to the TFT 11.

In the illustrated example, the pixel electrode PE is electrically connected to the drain electrode DE of the TFT 11 with a contact electrode 16 interposed therebetween. The contact electrode 16 is formed of the same metal film as the reflective layer 13 (that is, in the same layer as the reflective layer 13). A first contact hole CH1 that exposes at least a portion of the drain electrode DE of the TFT 11 is formed in the first interlayer insulating layer 12, and the contact electrode 16 is connected to the drain electrode DE of the TFT 11 at the first contact hole CH1. Also, a second contact hole CH2 that exposes at least a portion of the contact electrode 16 is formed in the second interlayer insulating layer 14, and the pixel electrode PE is connected to the contact electrode 16 at the second contact hole CH2. Note that an opening 13o is formed in the region of the reflective layer 13 that overlaps the first contact hole CH1 and the second contact hole CH2.

In this manner, the pixel electrode PE is connected to the TFT 11 via both the first contact hole CH1 and the second contact hole CH2. When viewed in the normal direction of the display surface, the center of the first contact hole CH1 and the center of the second contact hole CH2 do not overlap each other. Also, in this example, when viewed in the normal direction of the display surface, the first contact hole CH1 and the second contact hole CH2 do not overlap each other.

The dielectric layer 15 is provided covering the pixel electrode PE.

The common electrode CE is provided above the dielectric layer 15. That is, the common electrode CE is adjacent to the pixel electrode PE, with the dielectric layer 15 interposed therebetween. The common electrode CE is formed of a transparent conductive material. A material the same as or similar to that of the pixel electrode PE can be used as the transparent conductive material for forming the common electrode CE. Note that although not illustrated in FIGS. 3 and 4G, the common electrode CE includes, for each pixel P, a plurality of strip-like portions and at least one slit located between two adjacent strip-like portions. Since the slits are formed in the common electrode CE, a fringe electrical field (transverse electrical field) is generated in the liquid crystal layer 30 in accordance with the potential difference between the pixel electrode PE and the common electrode CE.

Figure 4A:
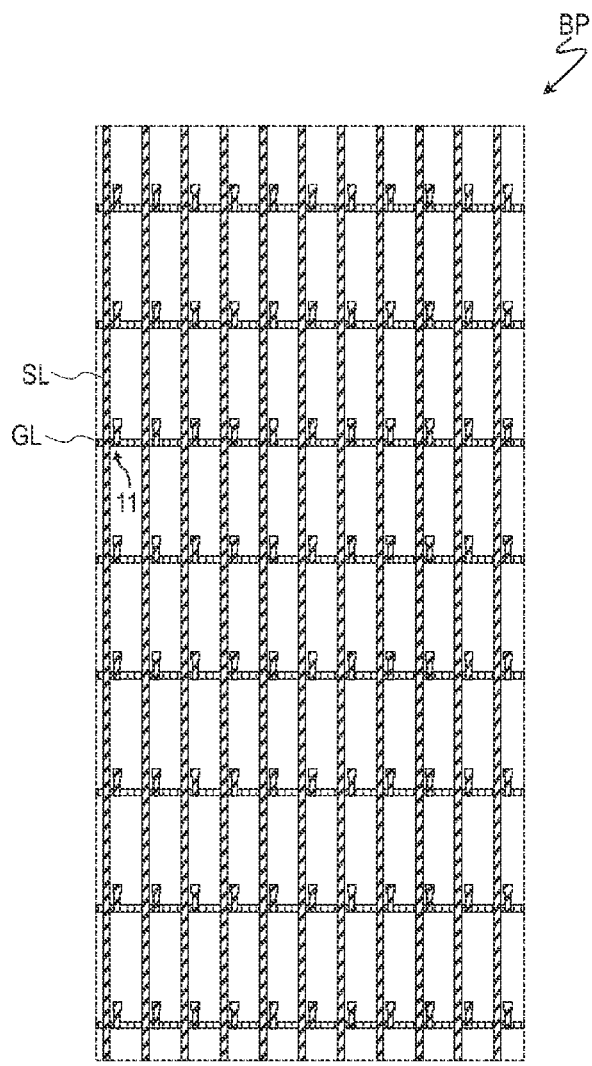
FIG. 4A is a plan view schematically illustrating a backplane circuit BP of a TFT substrate 10 provided in the liquid crystal display device 100.
Figure 4B:
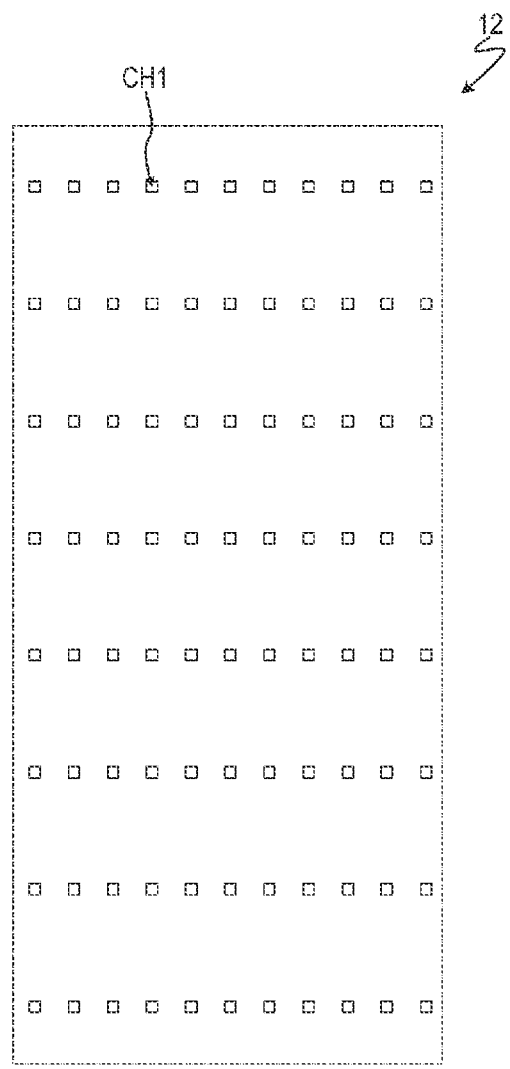
FIG. 4B is a plan view schematically illustrating a first interlayer insulating layer 12 of the TFT substrate 10.
Figure 4C:
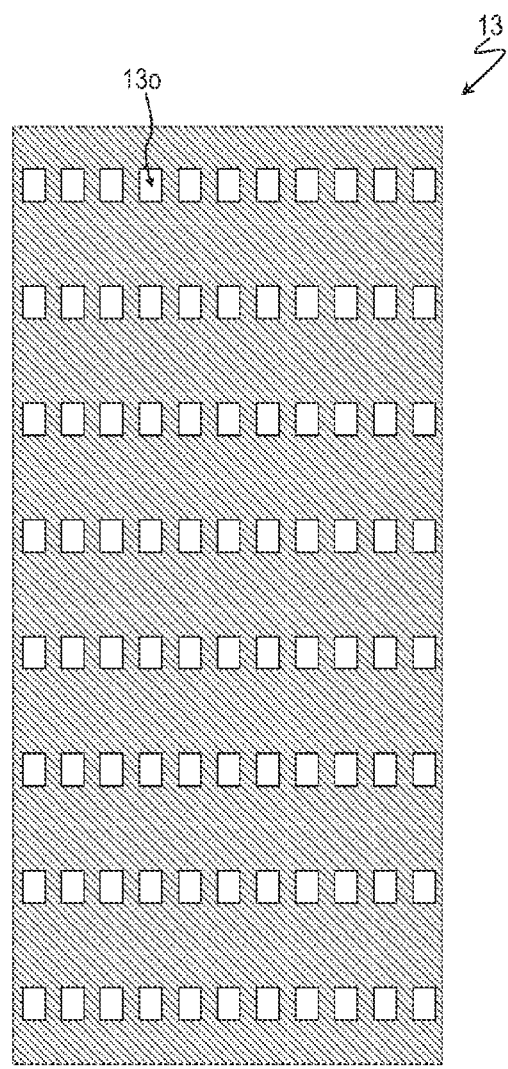
FIG. 4C is a plan view schematically illustrating a reflective layer 13 of the TFT substrate 10.
Figure 4D:
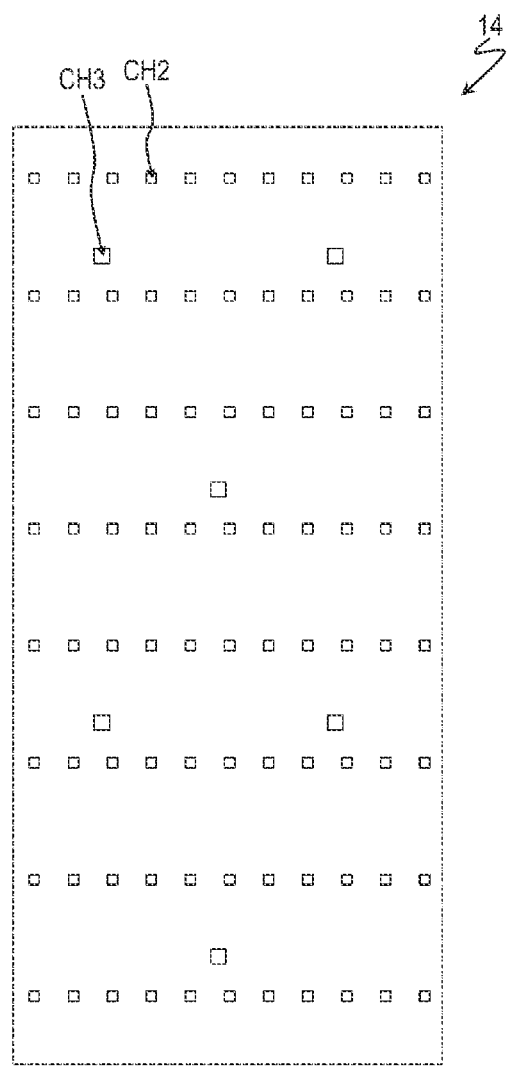
FIG. 4D is a plan view schematically illustrating a second interlayer insulating layer 14 of the TFT substrate 10.
Figure 4E:
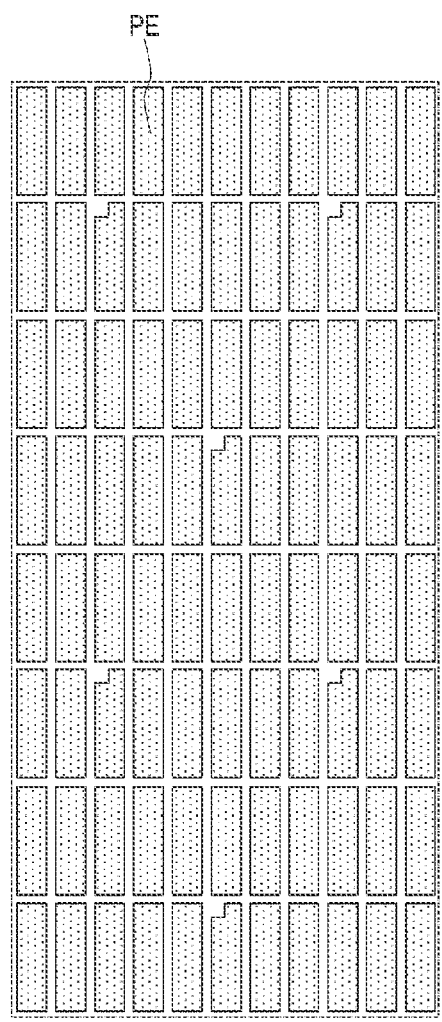
FIG. 4E is a plan view schematically illustrating a pixel electrode PE of the TFT substrate 10.
Figure 4F:
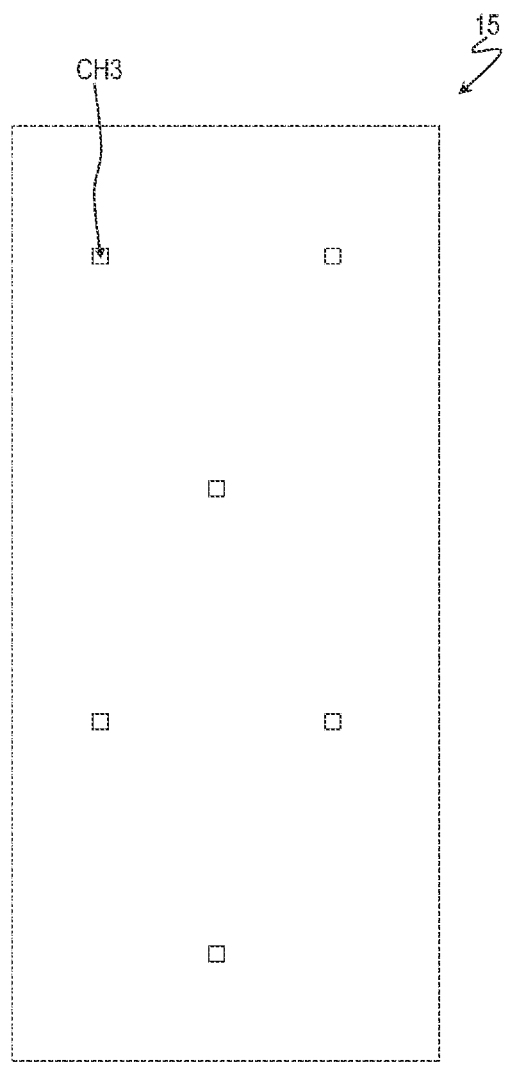
FIG. 4F is a plan view schematically illustrating a dielectric layer 15 of the TFT substrate 10.
Figure 4G:
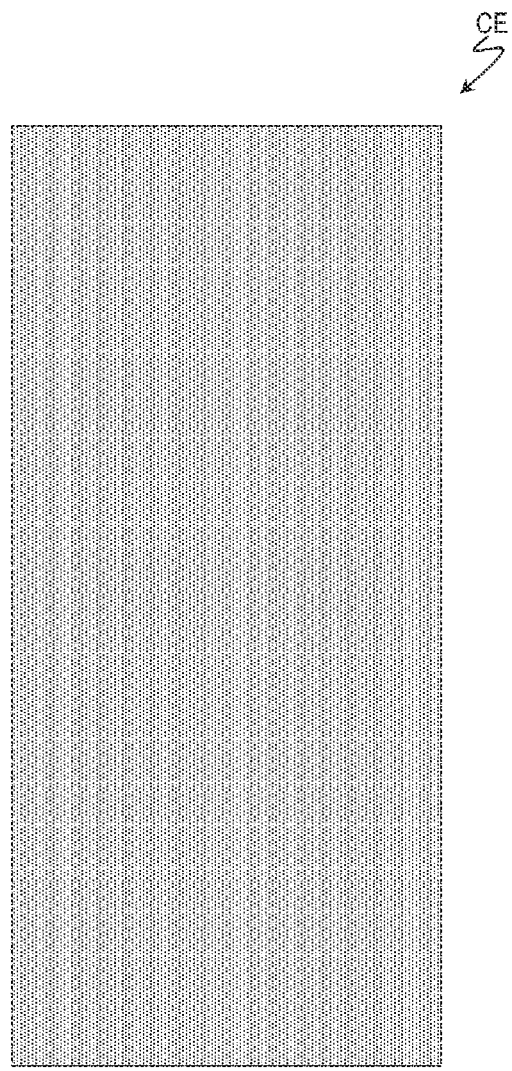
FIG. 4G is a plan view schematically illustrating a common electrode CE of the TFT substrate 10.

The reflective layer 13 is electrically connected to the common electrode CE. At least one third contact hole CH3 is formed in at least the second interlayer insulating layer 14, and the reflective layer 13 is connected to the common electrode CE via the third contact hole CH3. In the present embodiment, as illustrated in FIGS. 4D and 4F, the plurality of the third contact holes CH3 are formed throughout both the dielectric layer 15 and the second interlayer insulating layer 14. When viewed in the normal direction of the display surface, the center of the third contact hole CH3 and the center of the first contact hole CH1 do not overlap each other. Also, in this example, when viewed in the normal direction of the display surface, the third contact hole CH3 and the first contact hole CH1 do not overlap each other.

The first horizontal alignment film 19 is provided above the common electrode CE and is in contact with the liquid crystal layer 30. Accordingly, the pixel electrode PE and the common electrode CE can be said to be provided between the second interlayer insulating layer 14 and the first horizontal alignment film 19. In addition, it can be said that the dielectric layer 15 is also provided between the second interlayer insulating layer 14 and the first horizontal alignment film 19. In this example, the pixel electrode PE is provided between the second interlayer insulating layer 14 and the dielectric layer 15, and the common electrode CE is provided between the dielectric layer 15 and the first horizontal alignment film 19.

The counter substrate 20 includes a substrate 20a, a color filter layer 21, and a second horizontal alignment film 29. Although not illustrated here, the counter substrate 20 further includes a plurality of columnar spacers.

The substrate 20a supports the color filter layer 21 and the like. The substrate 20a is transparent and has insulating properties. The substrate 20a is, for example, a glass substrate or a plastic substrate.

The color filter layer 21 typically includes a red color filter provided in a region corresponding to a red pixel, a green color filter provided in a region corresponding to a green pixel, and a blue color filter provided in a region corresponding to a blue pixel. The red color filter, green color filter, and blue color filter transmit red light, green light, and blue light, respectively.

Note that when color display is not performed, the color filter layer 21 may be omitted.

An overcoat layer (flattening layer) covering the color filter layer 21 may be provided as necessary. In addition, depending on the transparent conductive material (for the pixel electrode PE and the common electrode CE), the organic insulating material (for the first interlayer insulating layer 12 and the second interlayer insulating layer 14), the inorganic insulating material (for the dielectric layer 15), and the alignment film material (for the first horizontal alignment film 19 and the second horizontal alignment film 29) used, the white display may be yellowish. In this case, chromaticity adjustment (blue shift) may be performed by forming the overcoat layer with a blue resist to bring the chromaticity of the white display close to the chromaticity of a D65 light source, for example.

The columnar spacer defines the thickness (cell gap) of the liquid crystal layer 30. The columnar spacers can include a photosensitive resin.

The second horizontal alignment film 29 is provided on the color filter layer 21 and is in contact with the liquid crystal layer 30.

The liquid crystal layer 30 includes a nematic liquid crystal material having a positive dielectric anisotropy $\Delta\varepsilon$ (that is, a positive nematic liquid crystal material) or a nematic liquid crystal material having a negative dielectric anisotropy $\Delta\varepsilon$ (that is, a negative nematic liquid crystal material). The dielectric anisotropy $\Delta\varepsilon$ is the difference between the dielectric constant $\varepsilon_{//}$ in the major axis direction and the dielectric constant $\varepsilon_\perp$ in the minor axis direction of liquid crystal molecules 31 (that is, $\varepsilon_{//}-\varepsilon_\perp$). The liquid crystal layer 30 may further include a chiral agent as necessary. The liquid crystal layer 30 can be formed, for example, by the falling drop method. The thickness of the liquid crystal layer 30 is not particularly limited.

Each of the first horizontal alignment film 19 and the second horizontal alignment film 29 is subjected to alignment treatment and defines the alignment direction of the liquid crystal molecules 31 included in the liquid crystal layer 30. The alignment direction defined by the first horizontal alignment film 19 and the alignment direction defined by the second horizontal alignment film 29 are different from each other.

Since the first horizontal alignment film 19 and the second horizontal alignment film 29 are provided on either side of the liquid crystal layer 30, the liquid crystal molecules 31 of the liquid crystal layer 30 are horizontally aligned (that is, the pretilt angle is substantially 0°) at least in a state in which a voltage is not applied to the liquid crystal layer 30. As described above, the alignment direction defined by the first horizontal alignment film 19 and the alignment direction defined by the second horizontal alignment film 29 are different from each other. Thus, as illustrated in FIG. 3, the liquid crystal layer 30 has a twist alignment when no voltage is applied. When a voltage is applied to the liquid crystal layer 30, that is, when a transverse electrical field (fringe electrical field) is generated in the liquid crystal layer 30 by the pixel electrode PE and the common electrode CE, the alignment state of the liquid crystal layer 30 is changed by the transverse electrical field.

As described above, an in-cell touch panel that can perform display in a reflection mode is desired, but has not yet been realized. The reason is that one of a pair of electrodes (a common electrode, may be referred to as a counter electrode) for applying a voltage to a liquid crystal layer is provided on a counter substrate side in a liquid crystal display device that can perform display in a reflection mode.

On the other hand, in the liquid crystal display device 100 according to the present embodiment, a pair of electrodes (the pixel electrode PE and the common electrode CE) for applying a voltage to the liquid crystal layer 30 is provided only on the TFT substrate 10 side. Thus, by adopting the configuration like that of the liquid crystal display device 100 according to the present embodiment, an in-cell touch panel that can perform display in a reflection mode can be realized. An additional configuration required when the liquid crystal display device 100 is used as an in-cell touch panel will be described in detail below.

Note that in the example configuration described above, the common electrode CE is provided above the pixel electrode PE. However, conversely, as described below in the second embodiment, the pixel electrode PE may be provided above the common electrode CE. Hereinafter, among the pixel electrode PE and the common electrode CE, the electrode located relatively above may be referred to as the "upper layer electrode", and the electrode located relatively below may be referred to as the "lower layer electrode". In order to generate the transverse electrical field, at least the upper layer electrode includes, in each pixel P, a plurality of strip-like portions and at least one slit located between two adjacent strip-like portions.

As described in the present embodiment, when the reflective layer 13 is electrically connected to the common electrode CE, the resistivity of the common electrode CE can be reduced, and thus the display quality is improved. A conceivable configuration for lowering the resistivity of the common electrode CE may include a configuration in which a metal wiring line is formed separately and the metal wiring line and the common electrode CE are electrically connected. However, as in the present embodiment, when the reflective layer 13 is electrically connected to the common electrode CE, compared to when a metal wiring line is formed separately, an increase in the number of masks and processes required for manufacture can be suppressed, allowing the cost to be reduced.

Note that the reflective layer 13 may not be electrically connected to the common electrode CE. For example, the reflective layer 13 may be in an electrically floating state.

Also, in the liquid crystal display device 100 according to the present embodiment, display is performed in the transverse electrical field mode in which the liquid crystal layer 30 has a twist alignment when no voltage is applied. More specifically, display is performed in a fringe field switching (FFS) mode in which the liquid crystal layer 30 has a twist alignment when no voltage is applied (referred to as a "TW-FFS mode"). Accordingly, the contrast ratio of the reflective display can be improved compared to a case in which the display is performed in the typical FFS mode in which the liquid crystal layer 30 does not have a twist alignment when no voltage is applied (that is, the twist angle of the liquid crystal layer 30 is 0°). From the viewpoint of improving the contrast ratio, the twist angle of the liquid crystal layer 30 when no voltage is applied is preferably in a range from 45° to 90°.

Also, in the present embodiment, the reflective layer 13 is located between the liquid crystal layer 30 and the TFT 11, and when viewed in the normal direction of the display surface, the reflective layer 13 at least partially overlaps the TFT 11. By adopting such a configuration, the reflective aperture ratio can be increased, and a brighter reflective display can be realized. In addition, the TFT 11 can be protected from external light, and reliability is improved.

Furthermore, since the first interlayer insulating layer 12 is disposed between the reflective layer 13 and the backplane circuit BP, the parasitic capacitance can be reduced.

Also, in the present embodiment, the reflective layer 13 is adjacent to the electrode located relatively lower from among the pixel electrode PE and the common electrode CE (the pixel electrode PE in this case), with at least the second interlayer insulating layer 14 interposed therebetween. By adopting such a configuration, even if the reflective layer 13 has an uneven surface structure, the pixel electrode PE can be leveled and the mode efficiency can be increased.

In addition, when the pixel electrode PE is connected to the TFT 11 via both the first contact hole CH1 and the second contact hole CH2 as in the present embodiment (that is, the contact holes for connecting the pixel electrode PE and the TFT 11 are divided into two in the depth direction), the depths of the respective contact holes can be reduced, and thus the flatness of the surface of the pixel electrode PE is improved. Thus, the alignment disorder of the liquid crystals is suppressed and the display quality is enhanced. In addition, advantageously, the wettability of the alignment film material is enhanced, the uniformity of the thickness of the first horizontal alignment film 19 is improved, and the reliability is improved.

As described above, the reflective layer 13 is connected to the common electrode CE at the third contact hole CH3. Hereinafter, a preferable arrangement of the third contact hole CH3 will be described.

As illustrated in FIGS. 4D and 4F, the plurality of third contact holes CH3 are preferably formed in the second interlayer insulating layer 14 and the dielectric layer 15. Since the reflective layer 13 is connected to the common electrode CE at the plurality of third contact holes CH3, the effect of reducing the resistivity of the common electrode CE and improving the display quality is increased. In addition, from the viewpoint of redundancy of connection, a plurality of the third contact holes CH3 are preferably formed.

The number of the third contact holes CH3 is not limited. However, if the number of the third contact holes CH3 is too large, the reflectivity may be decreased. Thus, from the viewpoint of maintaining sufficiently high reflectivity, the number of the third contact holes CH3 is preferably less than the number of the pixels P as illustrated in FIGS. 4D and 4F. The number of the third contact holes CH3 may be, for example, one third or less of the number of the pixels P. In this case, the third contact holes CH3 may be provided corresponding to some or all of the pixels P of a certain color (that is, red pixels, green pixels, or blue pixels).

When each of two adjacent third contact holes CH3, from among the plurality of third contact holes CH3, are separated from each other by a distance corresponding to one pixel or more along the row direction and/or the column direction, the occurrence of grainy display unevenness can be suppressed.

At least one third contact hole CH3 from among the plurality of third contact holes CH3 may be located between two adjacent pixel electrodes PE when viewed in the normal direction of the display surface. By adopting such a configuration, the reflectivity can be further increased and the disorder of the alignment in the pixel P can be suppressed.

When the reflective layer 13 has an uneven surface structure as in the present embodiment, the thickness of the second interlayer insulating layer 14 is preferably greater than the height difference of the uneven surface structure of the reflective layer 13. When an uneven shape reflecting the uneven surface structure of the reflective layer 13 is present on the surface of the TFT substrate 10 on the liquid crystal layer 30 side (the interface between the TFT substrate 10 and the liquid crystal layer 30), the cell thickness (the thickness of the liquid crystal layer 30) may become non-uniform and the contrast ratio may decrease. Since the thickness of the second interlayer insulating layer 14 is greater than the height difference of the uneven surface structure of the reflective layer 13, the uneven surface structure of the reflective layer 13 can be leveled by the second interlayer insulating layer 14. Thus, the uneven surface structure of the reflective layer 13 is less likely to be reflected on the surface of the TFT substrate 10 on the liquid crystal layer 30 side, and a decrease in contrast ratio due to non-uniformity in cell thickness can be suppressed. Instead of forming the uneven surface structure on the reflective layer 13, conceivably, a light scattering sheet may be used (for example, the light scattering sheet may be disposed on the viewer side of the counter substrate 20). However, even in this case, depending on the specifications of the light scattering sheet to be used, there is still concern about a decrease in contrast ratio.

From the viewpoint of suppressing a decrease in contrast ratio due to non-uniformity in cell thickness, the thickness of the second interlayer insulating layer 14 is preferably twice or more the height difference of the uneven surface structure. Depending on the thickness of the second interlayer insulating layer 14, the uneven surface structure of the reflective layer 13 may not be completely leveled. In this case, the upper surface of the portion of the second interlayer insulating layer 14 that overlaps the uneven surface structure of the reflective layer 13 has an uneven shape, and the height difference of the uneven shape is preferably half or less of the height difference of the uneven surface structure of the reflective layer 13.

Second Embodiment

Figure 5:
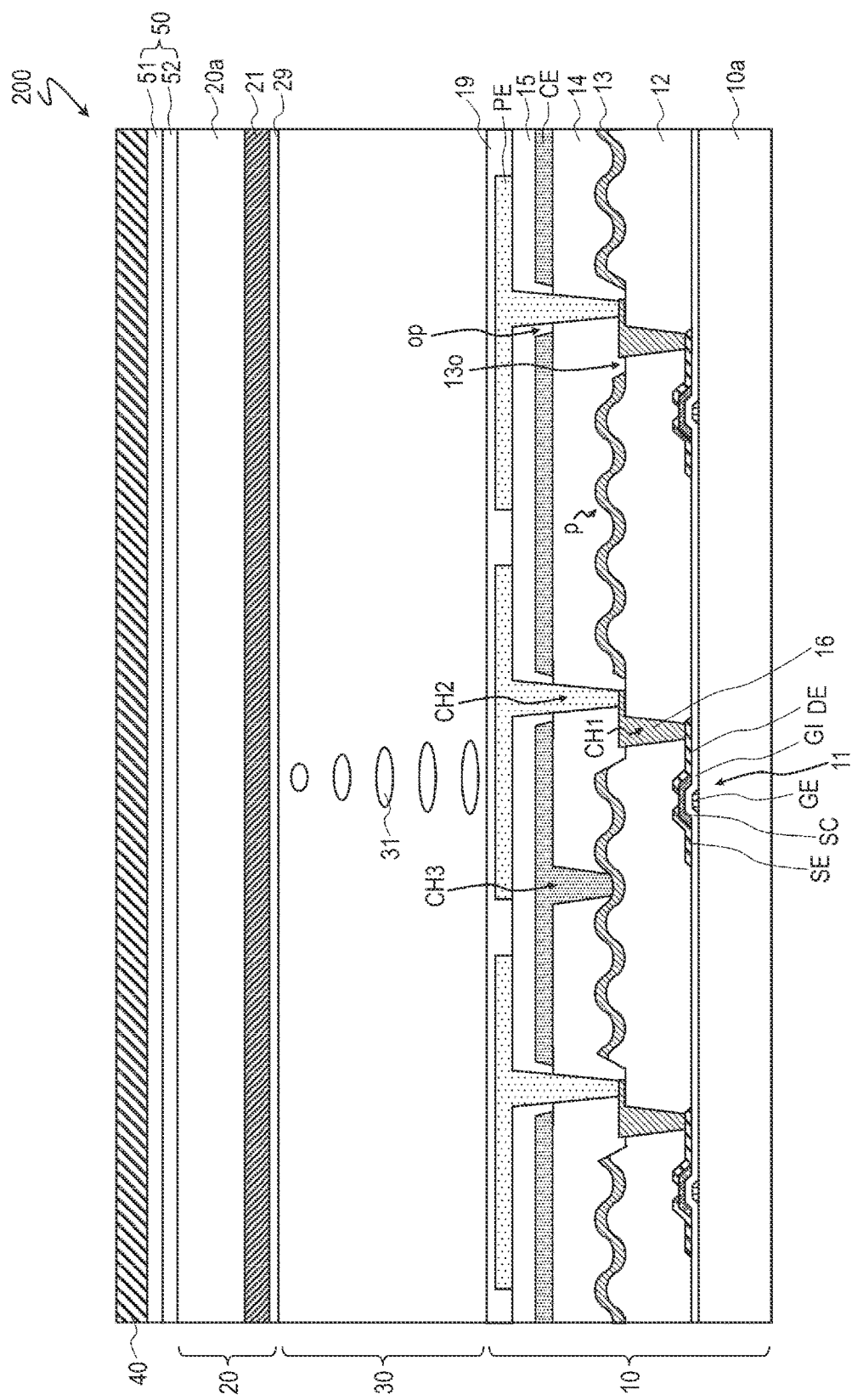
FIG. 5 is a cross-sectional view schematically illustrating another liquid crystal display device 200 according to an embodiment of the disclosure.
Figure 6A:
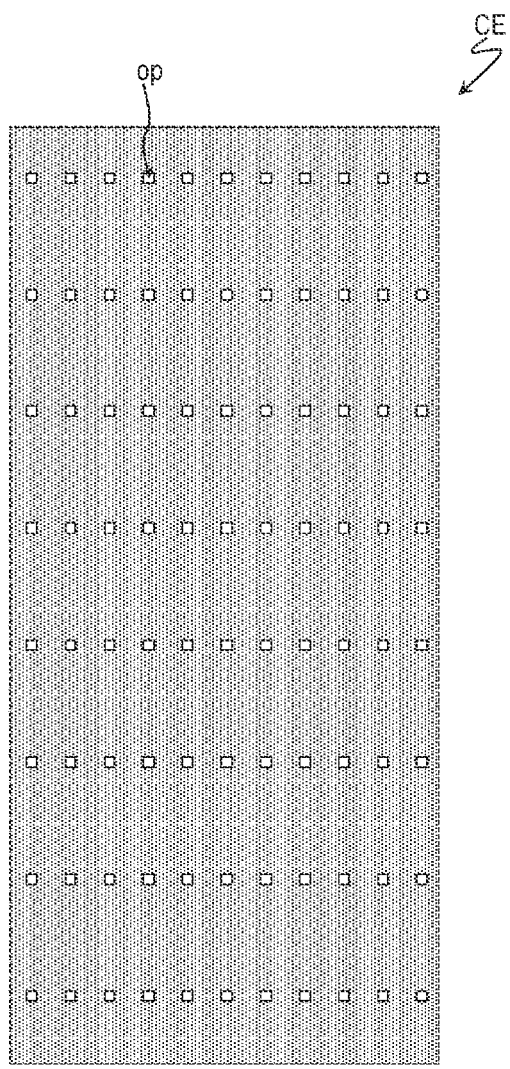
FIG. 6A is a plan view schematically illustrating the common electrode CE of the TFT substrate 10 provided in the liquid crystal display device 200.
Figure 6B:
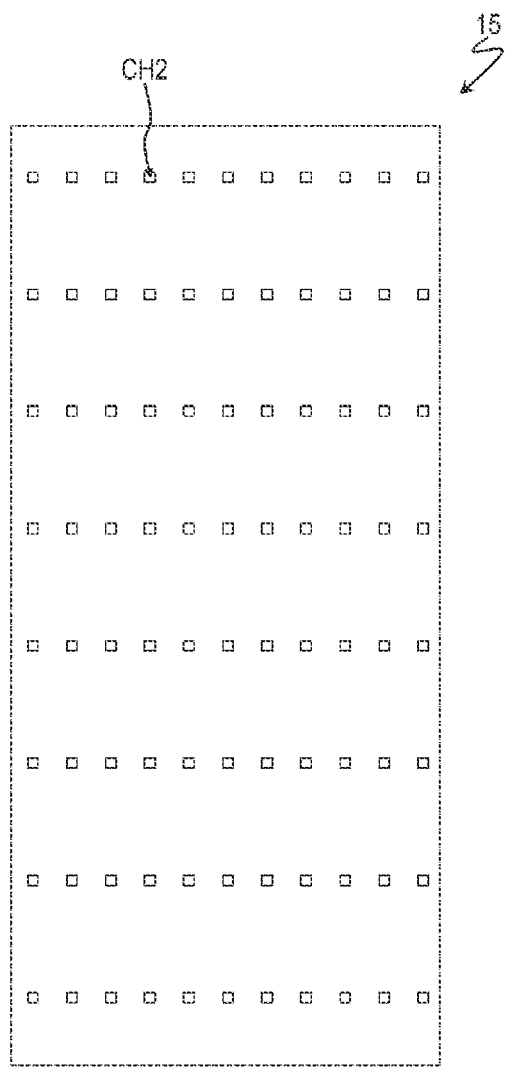
FIG. 6B is a plan view schematically illustrating the dielectric layer 15 of the TFT substrate 10 of the liquid crystal display device 200.
Figure 6C:
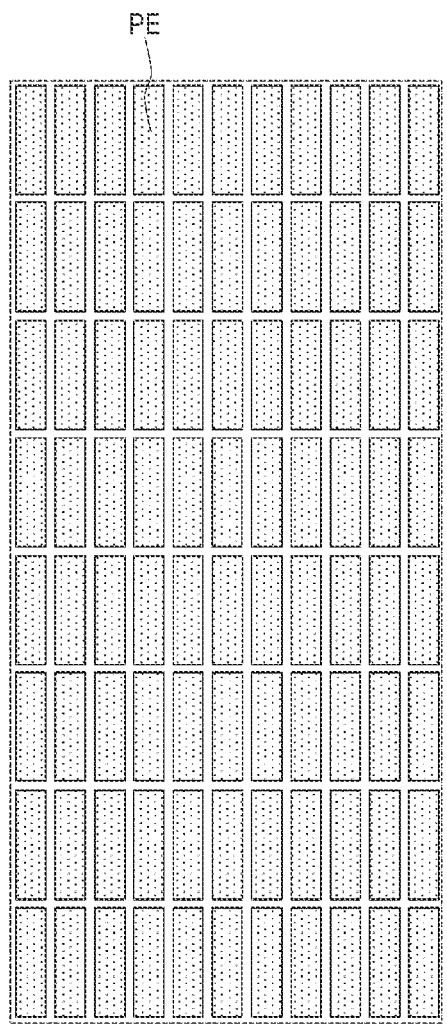
FIG. 6C is a plan view schematically illustrating the pixel electrode PE of the TFT substrate 10 of the liquid crystal display device 200.

A liquid crystal display device 200 according to the present embodiment will be described with reference to FIGS. 5 and 6A to 6C. FIG. 5 is a cross-sectional view schematically illustrating the liquid crystal display device 200. FIGS. 6A to 6C are plan views schematically illustrating the common electrode CE, the dielectric layer 15, and the pixel electrode PE of the TFT substrate 10 included in the liquid crystal display device 200. For the backplane circuit BP, the first interlayer insulating layer 12, the reflective layer 13, and the second interlayer insulating layer 14, refer to FIGS. 4A to 4D as they may have the same configuration as in the liquid crystal display device 100 according to the first embodiment.

In the liquid crystal display device 100 according to the first embodiment, the common electrode CE is provided above the pixel electrode PE. On the other hand, in the liquid crystal display device 200 according to the present embodiment, as illustrated in FIG. 5, the pixel electrode PE is provided above the common electrode CE.

The common electrode CE is provided above the second interlayer insulating layer 14 and is connected to the reflective layer 13 at the third contact hole CH3 formed in the second interlayer insulating layer 14. The dielectric layer 15 is provided covering the common electrode CE, and the pixel electrode PE is provided above the dielectric layer 15. The pixel electrode PE is connected to the contact electrode 16 at the second contact hole CH2 formed throughout both the dielectric layer 15 and the second interlayer insulating layer 14. An opening op is formed in a region of the common electrode CE that overlaps the second contact hole CH2. Also in the present embodiment, the reflective layer 13 is located on the opposite side to the liquid crystal layer 30 relative to the pixel electrode PE and the common electrode CE (in other words, more to the back surface side than the pixel electrode PE and the common electrode CE). In addition, it can be said that the pixel electrode PE and the common electrode CE are provided between the second interlayer insulating layer 14 and the first horizontal alignment film 19, and the dielectric layer 15 is also provided between the second interlayer insulating layer 14 and the first horizontal alignment film 19. In the present embodiment, the common electrode CE is provided between the second interlayer insulating layer 14 and the dielectric layer 15, and the pixel electrode PE is provided between the dielectric layer 15 and the first horizontal alignment film 19.

Note that although not illustrated in FIGS. 5 and 6C, the pixel electrode PE includes a plurality of strip-like portions and at least one slit located between two adjacent strip-like portions. Since the slits are formed in the pixel electrode PE, a fringe electrical field is generated in the liquid crystal layer 30 in accordance with the potential difference between the pixel electrode PE and the common electrode CE.

As in the liquid crystal display device 100 according to the first embodiment, in the liquid crystal display device 200 according to the present embodiment also, a pair of electrodes (the pixel electrode PE and the common electrode CE) for applying a voltage to the liquid crystal layer 30 is provided only on the TFT substrate 10 side. This allows an in-cell touch panel that can perform display in a reflection mode to be realized.

Note that as described above, in a configuration in which the pixel electrode PE is provided above the common electrode CE, a slit is formed in at least the pixel electrode PE, and in a configuration in which the common electrode CE is provided above the pixel electrode PE, a slit is formed in at least the common electrode CE.

In a liquid crystal display device having a relatively large size (that is, the area of the pixels P is relatively large), the pixel electrode PE is preferably provided above the common electrode CE. In a configuration in which the pixel electrode PE is provided above the common electrode CE, a slit does not need to be formed in the common electrode CE. Thus, compared to a configuration in which the common electrode CE is provided above the pixel electrode PE, an increase in the resistivity (surface resistivity) of the common electrode CE is suppressed. When the resistivity of the common electrode CE increases, the rate of supply of charge to the common electrode CE decreases, and a display defect (for example, flicker, shadow, or the like) is likely to occur in an image requiring a large amount of charge to be supplied to the common electrode CE (for example, an image in which the polarities of the pixels are biased such as an image formed of a checkered pattern, a stripe pattern, or an image in which a partial region of the display is formed of these patterns).

Note that in a configuration in which the pixel electrode PE is provided above the common electrode CE, a slit needs to be formed in the pixel electrode PE. Thus, the resistivity of the pixel electrode PE is increased, the area of the pixel electrode PE is sufficiently smaller than the area of the common electrode CE (for example, $\frac{1}{1000000}$ or less). This allows the amount of charge to be supplied to be reduced and charge to be supplied from the TFT 11 connected per pixel. Accordingly, this configuration is less likely to be affected by the display image, and display defect are also less likely to occur.

In order to suppress an increase in the resistivity of the common electrode CE, conceivably, a low resistance wiring line formed of a metal material may be used (the low resistance wiring line may be connected to the common electrode CE). However, in such a configuration, there are adverse effects on display (for example, glare, iridescent diffraction, and interference patterns) caused by specular reflection or the like due to the low resistance wiring line. Thus, it is necessary to shield light with a black matrix or the like, and the reflective aperture ratio is decreased.

Note that, in a configuration in which the pixel electrode PE is provided above the common electrode CE, a slit for generating a fringe electrical field cannot be provided in the pixel electrode PE in the region where the second contact hole CH2 is formed, and it is necessary to provide the opening op in the common electrode CE in that region. Thus, an effective fringe electrical field is not generated in the region, the region does not contribute to reflective display, and the reflectivity can be reduced compared to a configuration in which the common electrode CE is provided above the pixel electrode PE. The area of the region that does not contribute to the reflective display, such as the contact hole, is required to be a certain size regardless of the size of the area of the pixel P. Thus, the proportion of the region that does not contribute to the reflective display in the pixel P increases as the area of the pixel P decreases (that is, as the definition increases), and the above-described decrease in the reflectivity become significant. In other words, in a relatively large liquid crystal display device, the proportion of the region that does not contribute to reflective display in the pixel P is easily reduced, and thus the above-described decrease in the reflectivity is more easily suppressed. For these reasons, it is advantageous for a liquid crystal display device having a relatively large size (the area of the pixels P being relatively large) to have a configuration in which the pixel electrode PE is provided above the common electrode CE.

In addition, as described above, the decrease in the reflectivity due to the region in which the second contact hole CH2 is formed not contributing to reflective display increases as the area of the pixel P decreases (that is, as the definition increases). Thus, in a liquid crystal display device having relatively high definition (that is, the area of the pixel P is relatively small), the common electrode CE is preferably provided above the pixel electrode PE.

Slit of Upper Layer Electrode

As described above, at least the upper layer electrode from among the pixel electrode PE and the common electrode CE includes at least one slit SL.

Figure 7A:
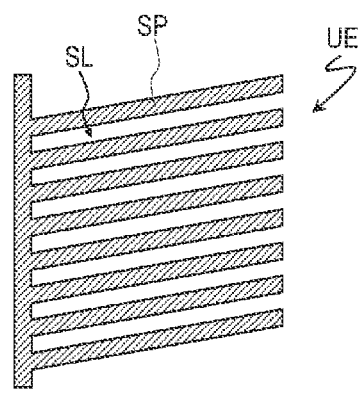
FIG. 7A is a plan view illustrating an example of an upper layer electrode UE.

An example of an upper layer electrode UE is illustrated in FIG. 7A. The upper layer electrode UE illustrated in FIG. 7A includes a plurality of strip-like portions SP and the plurality of slits SL. It goes without saying that the number of the strip-like portions SP and the number of the slits SL are not limited by the example illustrated in FIG. 7A.

Figure 7B:
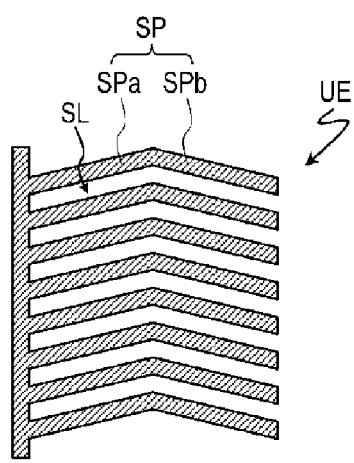
FIG. 7B is a plan view illustrating another example of the upper layer electrode UE.

Another example of the upper layer electrode UE is illustrated in FIG. 7B. As in the example illustrated in FIG. 7A, the upper layer electrode UE illustrated in FIG. 7B includes the plurality of strip-like portions SP and the plurality of slits SL. Also, in the example illustrated in FIG. 7B, each strip-like portion SP includes a first portion SPa extending in a certain direction (first direction) and a second portion SPb extending in a direction (second direction) different from the first direction. When the upper layer electrode UE has such a configuration, two liquid crystal domains having different alignment directions are formed in each pixel when a voltage is applied (hereinafter referred to as "dual domain alignment"), and thus, a color change (coloring of display) and a gray scale change accompanying a change in the viewing angle direction can be suppressed.

Figure 7C:
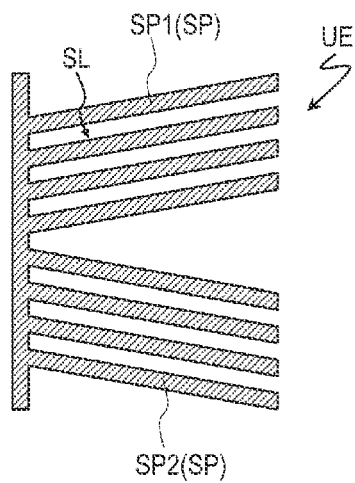
FIG. 7C is a plan view illustrating yet another example of the upper layer electrode UE.

Yet another example of the upper layer electrode UE is illustrated in FIG. 7C. As in the example illustrated in FIGS. 7A and 7B, the upper layer electrode UE illustrated in FIG. 7C includes the plurality of strip-like portions SP and the plurality of slits SL. Also, in the example illustrated in FIG. 7C, the plurality of strip-like portions SP include at least one (four in this example) first strip-like portion SP1 extending in a certain direction (first direction) and at least one (four in this example) second strip-like portion SP2 extending in a direction (second direction) different from the first direction. The dual domain alignment can also be realized by the upper layer electrode UE having such a configuration.

Reflective Layer

The reflective layer 13 may have a layered structure including a metal layer and a transparent conductive layer. An example of a preferable configuration in which the reflective layer 13 has such a layered structure will be described with reference to FIG. 8.

Figure 8:
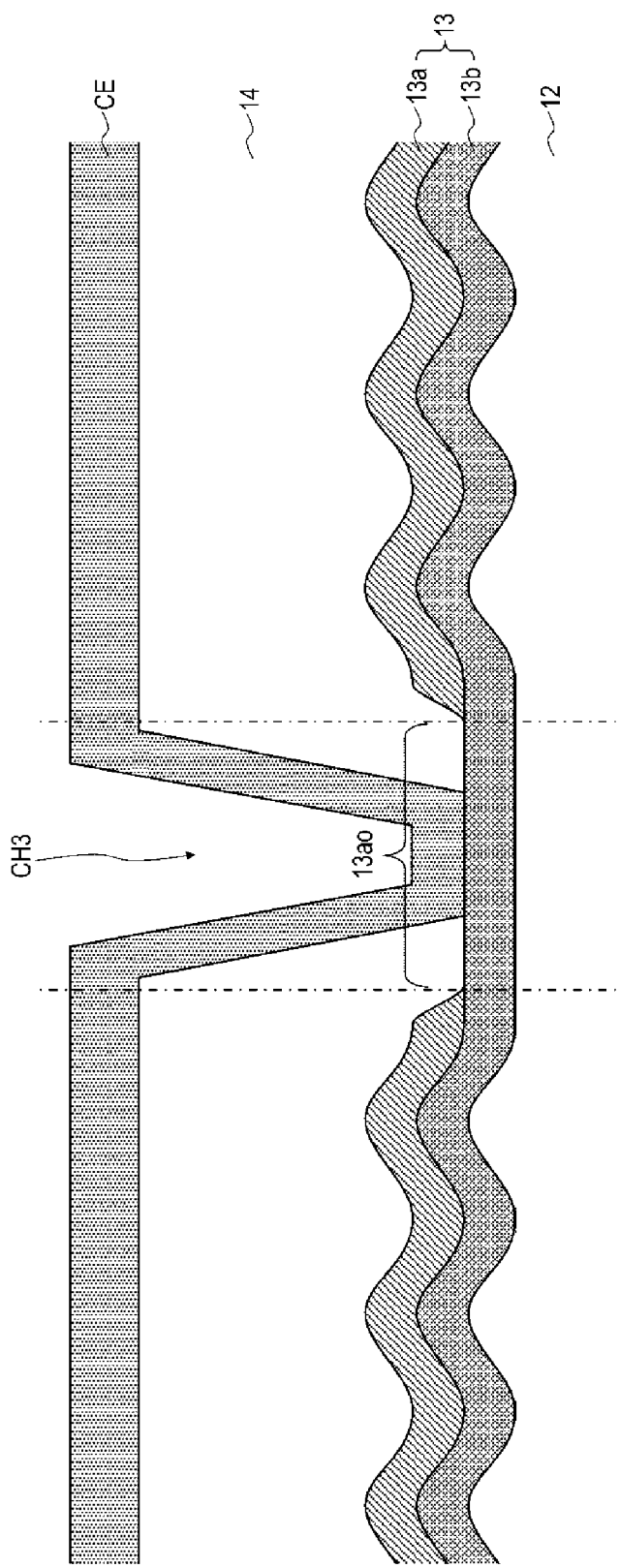
FIG. 8 is a cross-sectional view illustrating an example of a preferable configuration for the reflective layer 13 with a layered structure including a metal layer 13a and a transparent conductive layer 13b.

In the example illustrated in FIG. 8, the reflective layer 13 includes a transparent conductive layer 13*b* formed of a transparent conductive material and a metal layer 13*a* formed of a metal material and provided above the transparent conductive layer 13*b*. The metal layer 13*a* includes at least one opening 13*ao*, and the transparent conductive layer 13*b* is formed including a portion overlapping the opening 13*ao* of the metal layer 13*a*.

The number of the openings 13*ao* of the metal layer 13*a* is, for example, the same as the number of the third contact holes CH3, that is, the openings 13*ao* are formed to correspond to the third contact holes CH3. As illustrated in FIG. 8, when viewed in the normal direction of the display surface, the third contact hole CH3 overlaps the corresponding opening 13*ao*. That is, in the region where the common electrode CE is connected to the reflective layer 13, the metal material of the metal layer 13*a* is removed, and the common electrode CE is connected to the transparent conductive layer 13*b*.

In the area at or near the third contact hole CH3, the cell thickness and the fringe electrical field are different from those in other regions, so the alignment disorder occurs. In particular, in the black display state, the area at or near the third contact hole CH3 glows white (or gray) due to the effects of the alignment disorder, and the contrast ratio is lowered. As illustrated in FIG. 8, since the third contact hole CH3 overlaps the opening 13*ao* of the metal layer 13*a*, it is possible to suppress a decrease in the contrast ratio caused by the alignment disorder in the area at or near the third contact hole CH3.

Figure 9:
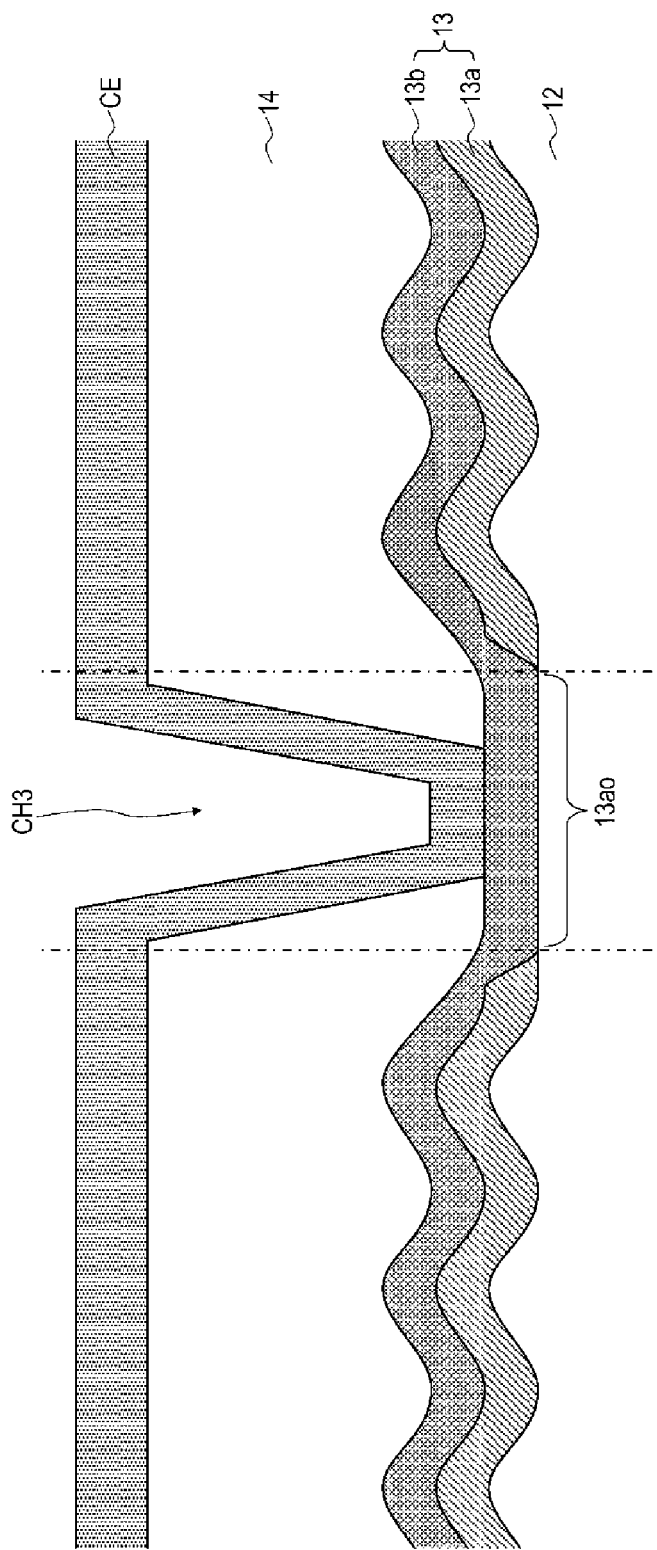
FIG. 9 is a cross-sectional view illustrating an example of a preferable configuration for the reflective layer 13 with a layered structure including the metal layer 13a and the transparent conductive layer 13b.

Note that although the metal layer 13*a* is provided above the transparent conductive layer 13*b* in the layered structure illustrated in FIG. 8, the transparent conductive layer 13*b* may be provided above the metal layer 13*a* as illustrated in FIG. 9. Also in the example illustrated in FIG. 9, since the third contact hole CH3 overlaps the opening 13*ao* of the metal layer 13*a*, a decrease in the contrast ratio can be suppressed.

FIGS. 8 and 9 illustrate examples in which, in a configuration in which the common electrode CE is provided below the pixel electrode PE, the reflective layer 13 has a layered structure. However, it goes without saying that the reflective layer 13 may have a layered structure in a configuration in which the common electrode CE is provided above the pixel electrode PE.

In-Cell Touch Panel

Figure 10:
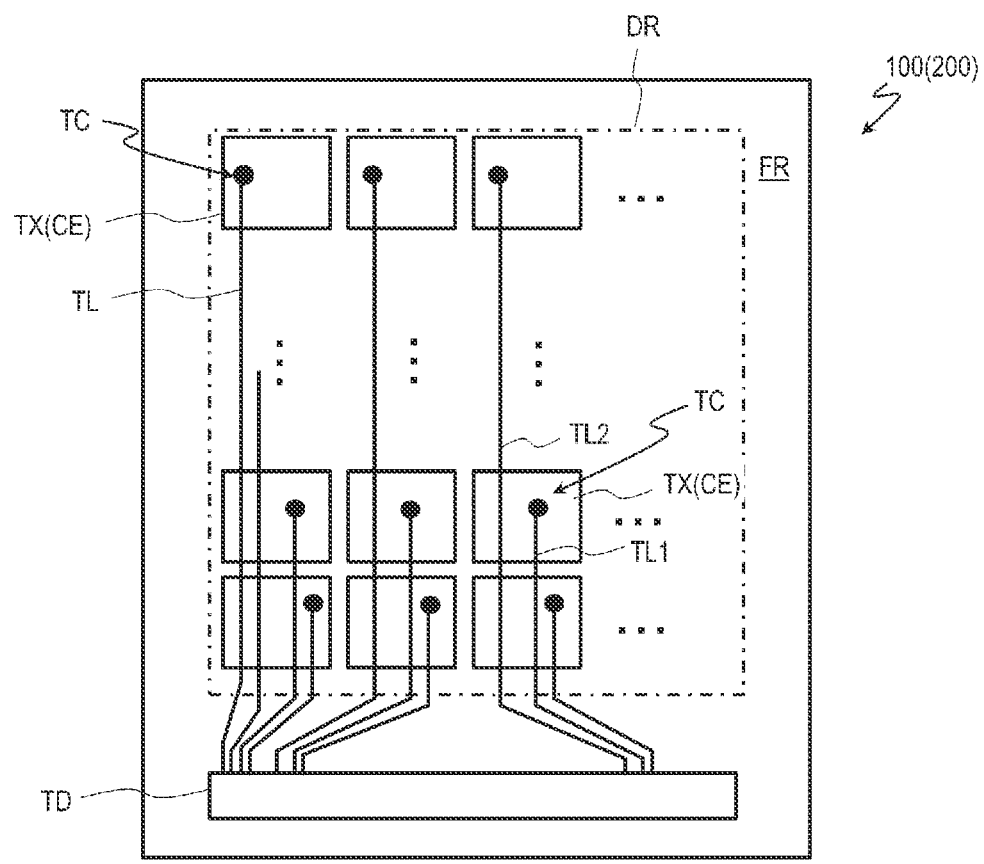
FIG. 10 is a plan view illustrating an example of an arrangement relationship between touch sensor electrodes and touch wiring lines in the liquid crystal display device 100 (or 200).

An example in which the liquid crystal display device 100 (or 200) is used as an in-cell touch panel will be described with reference to FIG. 10. FIG. 10 is a plan view illustrating an example of an arrangement relationship between touch sensor electrodes and touch wiring lines in the liquid crystal display device 100.

As illustrated in FIG. 10, the liquid crystal display device 100 includes a display region DR and a non-display region FR. The display region DR is defined by the plurality of pixels P arrayed in a matrix shape (see FIG. 2). The non-display region FR is positioned at the periphery of the display region DR, and may be referred to as a "peripheral region" or "frame region".

In the display region DR, the common electrode CE is divided into a plurality of segments TX. Each segment (common electrode portions) TX functions as a touch sensor electrode. In the example illustrated in FIG. 10, each touch sensor electrode TX is provided corresponding to two or more pixels P.

The liquid crystal display device 100 (more specifically, the TFT substrate 10) includes a plurality of touch wiring lines TL. Each touch sensor electrode TX is electrically connected to a corresponding touch wiring line TL. A connection portion TC between the touch sensor electrode TX and the touch wiring line TL is referred to as a "touch wiring line contact portion".

The touch wiring line TL is connected to a touch drive unit TD provided in the non-display region FR. The touch drive unit TD is configured to switch, for example, between a display mode in which the plurality of touch sensor electrodes TX function as the common electrode CE, and a touch detection mode in which the plurality of touch sensor electrodes TX function as the touch sensor electrode TX, in a time division manner. The touch drive unit TD, for example, applies a common signal to the touch sensor electrode TX (common electrode CE) through the touch wiring line TL in the display mode. On the other hand, in the touch detection mode, the touch drive unit TD applies a touch drive signal to the touch sensor electrode TX through the touch wiring line TL.

In the illustrated example, the plurality of touch wiring lines TL extend in the column direction (the same direction as the source bus lines SL). Some touch wiring lines TL extend across one or a plurality of other touch sensor electrodes TX to the corresponding touch sensor electrodes TX.

When attention is paid to one touch sensor electrode TX, a first touch wiring line TL1 for supplying a signal to the one touch sensor electrode TX extends to the touch wiring line contact portion TC, and a second touch wiring line TL2 for supplying a signal to another touch sensor electrode TX extends across the one touch sensor electrode TX. The second touch wiring line TL2 and a touch sensor electrode TX1 overlap each other with an insulating layer interposed therebetween. Note that depending on a position of the touch sensor electrode TX, two or more touch wiring lines TL may be arranged so as to extend across the touch sensor electrode TX, or no touch wiring line TL crossing the touch sensor electrode TX may be arranged.

Note that, although not illustrated, in the non-display region FR, in addition to the touch drive unit TD, a peripheral circuit including drive circuits such as a gate driver that supplies a gate signal to the gate bus line GL, a source driver that supplies a source signal to the source bus line SL, and the like is provided. These drive circuits may, for example, be mounted on the TFT substrate 10, or formed as an integral (monolithic) part. A semiconductor chip including some or all of the drive circuits may be mounted on the non-display region FR.

By using the liquid crystal display device 100 (or 200) according to an embodiment of the disclosure, an in-cell touch panel that can perform display in a reflection mode can be suitably realized.

Oxide Semiconductor TFT

As the TFT 11 provided in each pixel P, for example, an oxide semiconductor TFT can be suitably used (however, naturally no such limitation is intended). In the oxide semiconductor TFT, an oxide semiconductor is used as the active layer material. In other words, the oxide semiconductor TFT includes an oxide semiconductor layer as an active layer. In recent years, an oxide semiconductor has attracted attention as an active layer material that can be used in place of amorphous silicon and polycrystalline silicon.

The oxide semiconductor has mobility higher than that of amorphous silicon. Thus, the oxide semiconductor TFT can operate at a higher speed than an amorphous silicon TFT.

Further, since the oxide semiconductor layer is formed by a process simpler than that for the amorphous silicon layer, the oxide semiconductor layer can be applied to a device that requires a large area.

Further, since the oxide semiconductor TFT has excellent off-leakage characteristics, a driving method can be used that performs display with a reduced rewriting frequency of an image. For example, when displaying a still image, the oxide semiconductor TFT can be operated so that the image data is rewritten at a frequency of once per second. Such a driving method is referred to as a pause drive or a low frequency drive, and can significantly reduce the power consumption of the liquid crystal display device.

By adopting the pause drive and performing touch detection in a period in which rewriting of an image is not performed, it is possible to suppress a decrease in the sensitivity of a touch operation due to noise from the drive circuit and to increase an S/N ratio (signal-to-noise ratio) to approximately 10 times that in the related art, for example.

In addition, since the oxide semiconductor TFT can be advantageously used to decrease the size of the TFT, a configuration in which a memory circuit is provided for each pixel P (referred to as "memory in pixels (MIP)") can also be suitably realized. Since a specific configuration of an MIP is known, the description thereof is omitted herein.

The oxide semiconductor included in the active layer of the oxide semiconductor TFT (oxide semiconductor layer) may be an amorphous oxide semiconductor, or may be a crystalline oxide semiconductor including a crystalline portion. Examples of the crystalline oxide semiconductor include a polycrystalline oxide semiconductor, a microcrystalline oxide semiconductor, and a crystalline oxide semiconductor having a c-axis oriented substantially perpendicular to the layer surface.

The oxide semiconductor layer may have a layered structure including two or more layers. The oxide semiconductor layer having a layered structure may include an amorphous oxide semiconductor layer and a crystalline oxide semiconductor layer, and may include a plurality of crystalline oxide semiconductor layers having different crystal structures. In addition, the oxide semiconductor layer having a layered structure may include a plurality of amorphous oxide semiconductor layers. In a case where the oxide semiconductor layer has a dual-layer structure including an upper layer and a lower layer, an energy gap of the oxide semiconductor included in the lower layer may be different from an energy gap of the oxide semiconductor included in the upper layer.

Materials, structures, and film formation methods of an amorphous oxide semiconductor and the above-described crystalline oxide semiconductors, a configuration of an oxide semiconductor layer having a layered structure, and the like are described in, for example, JP 2014-007399 A. The entire contents of the disclosure of JP 2014-007399 A are incorporated herein by reference.

The oxide semiconductor layer may include, for example, at least one metal element selected from In, Ga, and Zn. In the present embodiment, the oxide semiconductor layer includes, for example, an In—Ga—Zn—O-based semiconductor (for example, an indium gallium zinc oxide). Here, the In—Ga—Zn—O based semiconductor is a ternary oxide of indium (In), gallium (Ga), and zinc (Zn), and a ratio (composition ratio) of In, Ga, and Zn is not particularly limited. For example, the ratio includes In:Ga:Zn=2:2:1, In:Ga:Zn=1:1:1, In:Ga:Zn=1:1:2, or the like. Such an oxide semiconductor layer 11 can be formed of an oxide semiconductor film including the In—Ga—Zn—O based semiconductor.

The In—Ga—Zn—O based semiconductor may be an amorphous semiconductor or may be a crystalline semiconductor. A crystalline In—Ga—Zn—O based semiconductor in which a c-axis is oriented substantially perpendicular to a layer surface is preferable as the crystalline In—Ga—Zn—O based semiconductor.

Note that a crystal structure of the crystalline In—Ga—Zn—O based semiconductor is disclosed in, for example, JP 2014-007399 A as described above, JP 2012-134475 A, and JP 2014-209727 A. The entire contents of the disclosure of JP 2012-134475 A and JP 2014-209727 A are incorporated herein by reference. A TFT including an In—Ga—Zn—O based semiconductor layer has a high mobility (more than 20 times as compared to an a-Si TFT) and a low leakage current (less than 1/100 as compared to the a-Si TFT). Thus, such a TFT can be suitably used as a drive TFT (for example, a TFT included in a drive circuit provided in a periphery of a display region including a plurality of pixels, and on the same substrate as the display region) and a pixel TFT (TFT provided in a pixel).

In place of the In—Ga—Zn—O-based semiconductor, the oxide semiconductor layer may include another oxide semiconductor. For example, the oxide semiconductor layer may include an In—Sn—Zn—O based semiconductor (for example, $In_2O_3$—$SnO_2$—ZnO; InSnZnO). The In—Sn—Zn—O based semiconductor is a ternary oxide of indium (In), tin (Sn), and zinc (Zn). Alternatively, the oxide semiconductor layer 11 may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, and an In—Ga—Zn—Sn—O based semiconductor.

Transflective Type

Figure 11:
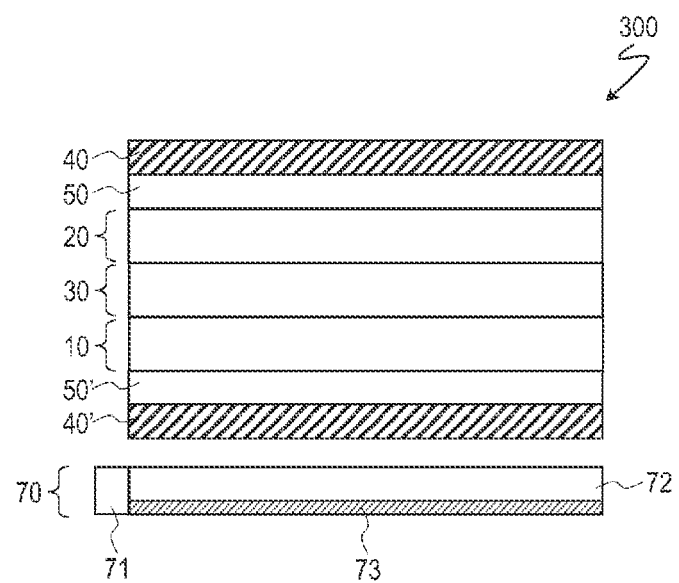
FIG. 11 is a cross-sectional view schematically illustrating yet another liquid crystal display device 300 according to an embodiment of the disclosure.

Note that examples of the reflective liquid crystal display devices 100 and 200 have been described above. However, the liquid crystal display device according to embodiments of the disclosure may be a transflective type. The configuration of a transflective liquid crystal display device 300 will be described with reference to FIG. 11.

The liquid crystal display device 300 is different from the liquid crystal display devices 100 and 200 in that it includes an additional polarizer 40', an additional retardation layer 50', and an illumination device (backlight) 70.

The polarizer 40' is disposed on the back surface side of the liquid crystal layer 30. More specifically, the polarizer 40' is disposed on the back surface side of the TFT substrate 10.

The retardation layer 50' is disposed between the polarizer 40' and the liquid crystal layer 30. More specifically, the retardation layer 50' is disposed between the polarizer 40' and the TFT substrate 10. The retardation layer 50' may include, for example, a λ/2 plate and a λ/4 plate.

An illumination device 70 is disposed on the back surface side of the polarizer 40' (the back surface side of the TFT substrate 10). In the illustrated example, the illumination device 70 includes a light source (for example, an LED) 71 that emits light, a light guide plate 72 that guides the light from the light source 71 toward the polarizer 40' side, and a reflector 73 disposed on the back surface side of the light guide plate 72. The illumination device 70 may further include a prism sheet and a diffuser sheet disposed on the front surface side (or back surface side) of the light guide plate 72.

Figure 12:
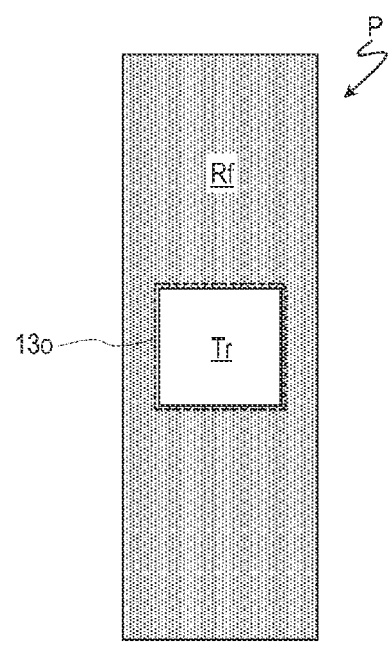
FIG. 12 is a diagram illustrating a reflective region Rf and a transmissive region Tr included in each pixel P of the liquid crystal display device 300.
Figure 13:
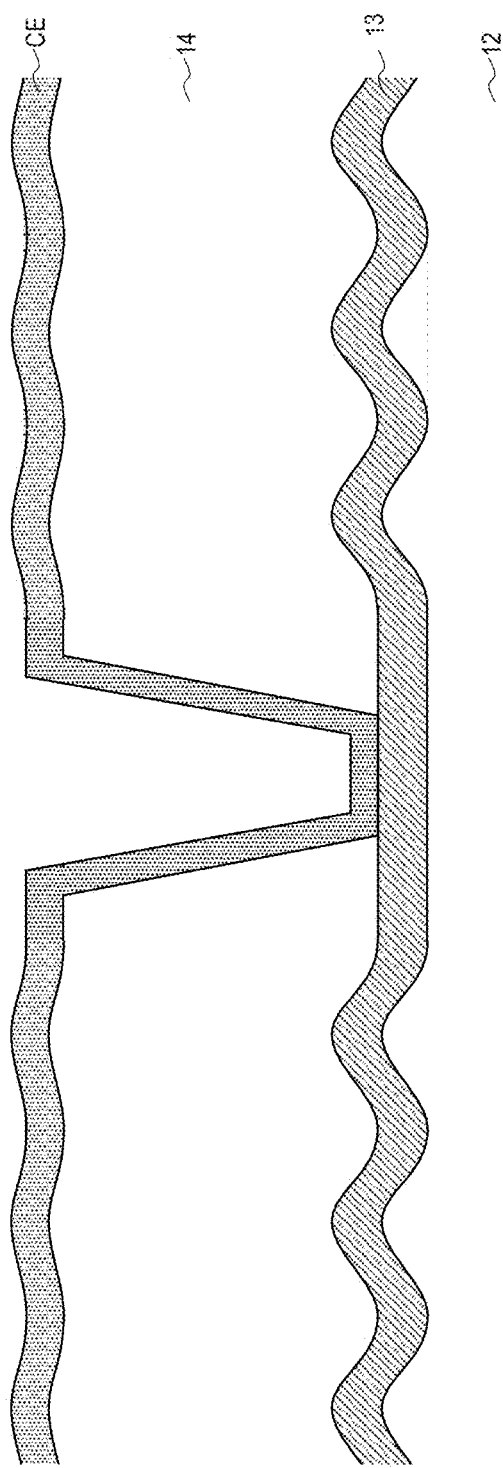
FIG. 13 is a cross-sectional view illustrating an example of a preferable configuration for showing an uneven shape of an upper surface of a portion of the second interlayer insulating layer 14.

Each pixel P of the liquid crystal display device 300 includes the reflective region Rf for display in a reflection mode and a transmissive region Tr for display in a transmission mode, as illustrated in FIG. 12. The reflective layer 13 of the TFT substrate 10 includes the opening 13o formed in the transmissive region Tr. The ratio of the area of the transmissive region Tr occupying the pixel P may be appropriately set depending on the application and the like, and is, for example, 20% or more and 90% or less. The position and the shape of the transmissive region Tr within the pixel P may also be appropriately set depending on the application or the like.

INDUSTRIAL APPLICABILITY

According to an embodiment of the disclosure, it is possible to realize a pixel structure suitable for a liquid crystal display device that can perform display in a reflection mode and be used as an in-cell touch panel. An embodiment of the disclosure can be suitably used in a reflective or transflective liquid crystal display device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
a first substrate;
a second substrate disposed closer to a viewer side than the first substrate;
a liquid crystal layer provided between the first substrate and the second substrate;
a polarizer disposed closer to the viewer side than the liquid crystal layer;
a retardation layer disposed between the polarizer and the liquid crystal layer; and
a plurality of pixels arrayed in a matrix shape including a plurality of rows and a plurality of columns,
wherein each one of the plurality of pixels includes a reflective region for display in a reflection mode,
the first substrate includes:
a thin film transistor corresponding to each one of the plurality of pixels,
a pixel electrode electrically connected to the thin film transistor,
a reflective layer located at least in the reflective region, and
a common electrode adjacent to the pixel electrode with a dielectric layer interposed between the pixel electrode and the common electrode,
at least one of the pixel electrode and the common electrode includes at least one slit,
the reflective layer is formed of a conductive material and electrically connected to the common electrode,
the reflective layer has a layered structure including a metal layer and a transparent conductive layer,
the metal layer includes at least one opening, and
the transparent conductive layer is formed with a portion overlapping the at least one opening.

2. The liquid crystal display device according to claim 1, wherein the first substrate further includes a first horizontal alignment film in contact with the liquid crystal layer,
the second substrate includes a second horizontal alignment film in contact with the liquid crystal layer, and
the liquid crystal layer has a twist alignment when no voltage is applied.

3. The liquid crystal display device according to claim 2, wherein a twist angle of the liquid crystal layer when no voltage is applied is in a range from 45° to 90°.

4. The liquid crystal display device according to claim 1, wherein the reflective layer is located between the liquid crystal layer and the thin film transistor and at least partially overlaps the thin film transistor when viewed in a normal direction of a display surface.

5. The liquid crystal display device according to claim 1, wherein the first substrate further includes a first interlayer insulating layer provided between the reflective layer and the thin film transistor.

6. The liquid crystal display device according to claim 1, wherein the first substrate further includes a second interlayer insulating layer provided between an electrode located relatively lower from among the pixel electrode and the common electrode and the reflective layer.

7. A liquid crystal display device comprising:
a first substrate;
a second substrate disposed closer to a viewer side than the first substrate;
a liquid crystal layer provided between the first substrate and the second substrate;
a polarizer disposed closer to the viewer side than the liquid crystal layer;
a retardation layer disposed between the polarizer and the liquid crystal layer; and
a plurality of pixels arrayed in a matrix shape including a plurality of rows and a plurality of columns,
wherein each one of the plurality of pixels includes a reflective region for display in a reflection mode,
the first substrate includes:
a thin film transistor corresponding to each one of the plurality of pixels,
a pixel electrode electrically connected to the thin film transistor,
a reflective layer located at least in the reflective region,
a common electrode adjacent to the pixel electrode with a dielectric layer interposed between the pixel electrode and the common electrode,
a first interlayer insulating layer provided between the reflective layer and the thin film transistor, and
a second interlayer insulating layer provided between an electrode located relatively lower compared to the pixel electrode, the common electrode, and the reflective layer,
at least one of the pixel electrode and the common electrode includes at least one slit,
a first contact hole is formed in the first interlayer insulating layer,
a second contact hole is formed in the second interlayer insulating layer, and
the pixel electrode is connected to the thin film transistor via both the first contact hole and the second contact hole.

8. The liquid crystal display device according to claim 7, wherein a center of the first contact hole and a center of the second contact hole do not overlap when viewed in a normal direction of a display surface.

9. The liquid crystal display device according to claim 7, wherein the first contact hole and the second contact hole do not overlap when viewed in a normal direction of a display surface.

10. The liquid crystal display device according to claim 7, wherein at least one third contact hole is formed in at least the second interlayer insulating layer, and the reflective layer is connected to the common electrode via the at least one third contact hole.

11. The liquid crystal display device according to claim 10, wherein the reflective layer has a layered structure including a metal layer and a transparent conductive layer, the metal layer includes at least one opening, the transparent conductive layer is formed with a portion overlapping the at least one opening, and a third contact hole, among the at least one third contact hole, overlaps an opening, among the at least one opening of the metal layer, when viewed in a normal direction of a display surface.

12. The liquid crystal display device according to claim 10, wherein a center of the first contact hole and a center of each of the at least one third contact hole do not overlap when viewed in a normal direction of a display surface.

13. The liquid crystal display device according to claim 10, wherein the first contact hole and the at least one third contact hole do not overlap when viewed in a normal direction of a display surface.

14. A liquid crystal display device comprising:
a first substrate;
a second substrate disposed closer to a viewer side than the first substrate;
a liquid crystal layer provided between the first substrate and the second substrate;
a polarizer disposed closer to the viewer side than the liquid crystal layer;
a retardation layer disposed between the polarizer and the liquid crystal layer; and
a plurality of pixels arrayed in a matrix shape including a plurality of rows and a plurality of columns,
wherein each one of the plurality of pixels includes a reflective region for display in a reflection mode,
the first substrate includes:
  a thin film transistor corresponding to each one of the plurality of pixels,
  a pixel electrode electrically connected to the thin film transistor,
  a reflective layer located at least in the reflective region,
  a common electrode adjacent to the pixel electrode with a dielectric layer interposed between the pixel electrode and the common electrode, and
  a second interlayer insulating layer provided between an electrode located relatively lower compared to the pixel electrode, the common electrode, and the reflective layer,
at least one of the pixel electrode and the common electrode includes at least one slit,
the reflective layer has an uneven surface structure,
a thickness of the second interlayer insulating layer is greater than a height difference of the uneven surface structure,
an upper surface of a portion of the second interlayer insulating layer that overlaps the uneven surface structure of the reflective layer has an uneven shape, and
a height difference of the uneven shape of the upper surface of the portion of the second interlayer insulating layer is half or less of the height difference of the uneven surface structure of the reflective layer.

15. The liquid crystal display device according to claim 14, wherein the thickness of the second interlayer insulating layer is twice or more the height difference of the uneven surface structure.

16. The liquid crystal display device according to claim 1, wherein each one of the plurality of pixels further includes a transmissive region for display in a transmission mode, and the reflective layer includes an opening formed in the transmissive region.

17. The liquid crystal display device according to claim 16, further comprising:
a light source and another polarizer disposed closer to a back surface side than the first substrate; and
another retardation layer disposed between the other polarizer and the liquid crystal layer.

18. The liquid crystal display device according to claim 7, wherein each one of the plurality of pixels further includes a transmissive region for display in a transmission mode, and the reflective layer includes an opening formed in the transmissive region.

19. The liquid crystal display device according to claim 14, wherein each one of the plurality of pixels further includes a transmissive region for display in a transmission mode, and the reflective layer includes an opening formed in the transmissive region.

* * * * *